(12) United States Patent
Wu et al.

(10) Patent No.: US 12,422,603 B2
(45) Date of Patent: Sep. 23, 2025

(54) ELECTRONIC DEVICE

(71) Applicant: InnoLux Corporation, Miao-Li County (TW)

(72) Inventors: Yuan-Lin Wu, Miao-Li County (TW); Tsung-Han Tsai, Miao-Li County (TW); Kuan-Feng Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 392 days.

(21) Appl. No.: 18/122,130

(22) Filed: Mar. 16, 2023

(65) Prior Publication Data

US 2023/0333296 A1 Oct. 19, 2023

(30) Foreign Application Priority Data

Apr. 13, 2022 (CN) .......................... 202210387259.0

(51) Int. Cl.
  *G02B 5/22* (2006.01)
(52) U.S. Cl.
  CPC ..................... *G02B 5/22* (2013.01)
(58) Field of Classification Search
  CPC ........... G02B 5/22; H10K 59/12; H10K 59/38
  See application file for complete search history.

(56) References Cited

U.S. PATENT DOCUMENTS

| | | |
|---|---|---|
| 10,553,805 B2 | 2/2020 | Maeda |
| 2006/0043888 A1* | 3/2006 | Nakagawa ............. H10K 50/86 |
| | | 313/506 |
| 2012/0168796 A1* | 7/2012 | Moon ................ H10K 59/8792 |
| | | 257/E51.019 |
| 2019/0267517 A1* | 8/2019 | Koshihara ............ H10K 59/876 |
| 2021/0225970 A1* | 7/2021 | Ryu ....................... H10K 59/38 |
| 2021/0233965 A1* | 7/2021 | Irobe .................... H10K 59/352 |
| 2022/0085112 A1* | 3/2022 | Huang ............... H10K 59/8792 |
| 2024/0188367 A1* | 6/2024 | Liu ....................... H10K 59/122 |
| 2024/0334794 A1* | 10/2024 | Hai ........................ H10K 59/60 |

* cited by examiner

*Primary Examiner* — Balram T Parbadia
(74) *Attorney, Agent, or Firm* — Winston Hsu

(57) ABSTRACT

The disclosure provides a display device which includes a first light-emitting unit, a second light-emitting unit, a first color filter and a second color filter. The first color filter is disposed on the first light-emitting unit, wherein the first color filter is in a color of blue. The second color filter is disposed on the second light-emitting unit, wherein the second color filter and the first color filter are different in color. The first color filter has a first width W1, a first distance D1 is between the first color filter and the first light-emitting unit, the second color filter has a second width W2, and a second distance D2 is between the second color filter and the second light-emitting unit. The first width, the second width, the first distance and the second distance satisfy $\tan^{-1}[(W1/2)/D1] > \tan^{-1}[(W2/2)/D2]$.

12 Claims, 14 Drawing Sheets

ELECTRONIC DEVICE

BACKGROUND OF THE DISCLOSURE

1. Field of the Disclosure

The disclosure relates to an electronic device, in particular to an electronic device which utilizes color filters to achieve anti-reflection.

2. Description of the Prior Art

In some electronic devices (such as display devices), a polarizer may be disposed at the light-emitting side of the display device. When an ambient light enters the display device from the light-emitting side of the display device, the ambient light may be reflected by the elements or films in the display device, and the polarizer may block the reflected light to achieve anti-reflection. However, the polarizer also reduces the light generated by the display device itself, and the display quality may be decreased. Therefore, it is necessary to solve the above problems.

SUMMARY OF THE DISCLOSURE

An embodiment of the disclosure provides a display device, which includes a substrate, a first light-emitting unit, a second light-emitting unit, a first color filter and a second color filter. The substrate includes a surface. The first light-emitting unit and the second light-emitting unit are disposed on the surface of the substrate. The first color filter is disposed on the first light-emitting unit, wherein the first color filter is in a color of blue. The second color filter is disposed on the second light-emitting unit, wherein the second color filter is different from the first color filter in color. The first color filter has a first width, a first distance is between the first color filter and the first light-emitting unit, the second color filter has a second width, and a second distance is between the second color filter and the second light-emitting unit. The first width, the second width, the first distance and the second distance satisfy an equation: $\tan^{-1}[(W1/2)/D1] > \tan^{-1}[(W2/2)/D2]$, where W1 represents the first width, W2 represents the second width, D1 represents the first distance and D2 represents the second distance.

These and other objectives of the present disclosure will no doubt become obvious to those of ordinary skill in the art after reading the following detailed description of the embodiment that is illustrated in the various figures and drawings.

DETAILED DESCRIPTION

Figure 1:
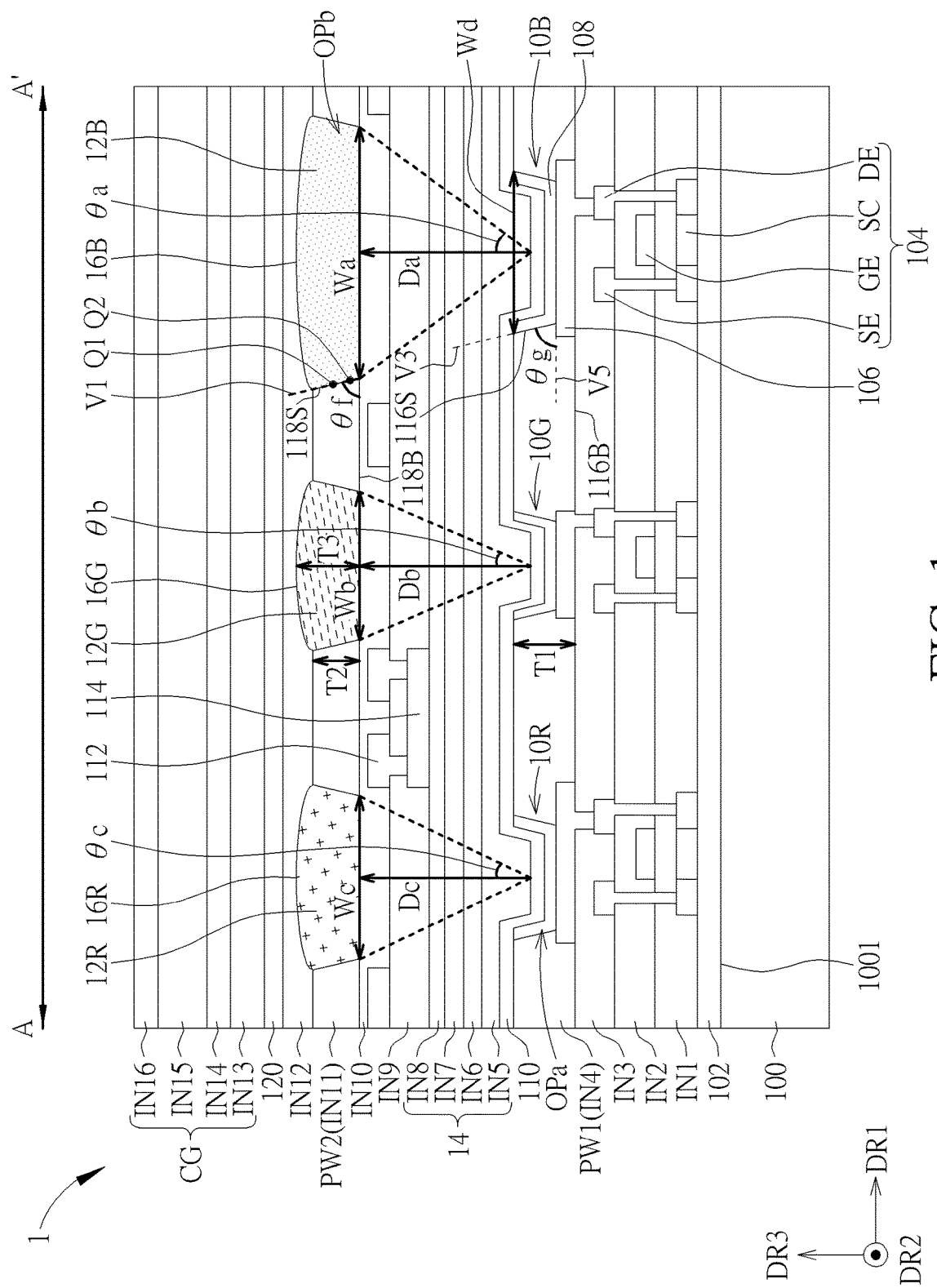
FIG. 1 is a schematic diagram illustrating a cross-sectional view of a display device according to a first embodiment of the present disclosure.

The contents of the present disclosure will be described in detail with reference to specific embodiments and drawings. It is noted that, for purposes of illustrative clarity and being easily understood by the readers, the following drawings may be simplified schematic diagrams, and elements therein may not be drawn to scale. The numbers and sizes of the elements in the drawings are just illustrative and are not intended to limit the scope of the present disclosure.

Certain terms are used throughout the specification and following claims to refer to particular elements. Those skilled in the art should understand that electronic equipment manufacturers may refer to an element by different names. This document does not intend to distinguish between elements that differ in name but not function. In the following description and claims, the terms "include", "comprise" and "have" are used in an open-ended fashion, and thus should be interpreted to mean "include, but not limited to . . . ".

Directional relative terms, such as, "on", "under", "front", "behind", "left", "right", and the like, used in the following embodiments just refer to the directions in the drawings and are not intended to limit the present disclosure. In the drawings, each drawing illustrates the general features of the methods, structures and/or materials used in a specific embodiment. However, these drawings should not be interpreted as defining or limiting the scope or nature covered by these embodiments. For example, the relative size, thickness and position of each film, region and/or structure may be reduced or enlarged for clarity.

It should be understood that when an element or a film is referred to as being "on", another element or film, "disposed on" another element or film or "connected to" another element or film, it may be directly on or connected to another element or film, or there may be an intervening element or film between them (indirect case). On the contrary, when an element is referred to be "directly on", "directly disposed on" or "directly connected to" another element or film, there is no intervening element or film between them. In addition, the setting relationship between different elements may be explained according to the contents of the drawings.

The term "same" is generally interpreted to be within 20% of a given value or range, or within 10%, 5%, 3%, 2%, 1% or 0.5% of a given value or range.

An electrical connection may be a direct connection or an indirect connection. When two elements are electrically connected, the electrical signals may be transmitted by direct contact, and there are no other elements presented between the two elements. When two elements are electrically connected, the electrical signals may be transmitted through the intermediate element bridging the two elements. The electrical connection may also be referred to as coupling.

Although the terms first, second, third . . . may be used to describe various constituent elements, constituent elements are not limited by these terms. These terms are only used to distinguish a single constituent element from other constituent elements in the specification. The same term may not be used in the claims, but may be replaced by the first, second, third, etc. in the order of element declared in the claims. Therefore, the first constituent element in the following specification may be the second constituent element in the claims.

It should be understood that according to the following embodiments, features of different embodiments may be replaced, recombined or mixed to constitute other embodiments without departing from the spirit of the present disclosure.

The thickness, area, width, etc. of the following different elements may be compared by suitable instruments such as an optical microscope (OM) and a scanning electron microscope (SEM), and the comparison may be conducted in the same photo or more than one photo.

When the element is lit, it may have an area with a color, and the color of the area may be directly or indirectly observed by the optical microscope, or indirectly observed by the scanning electron microscope.

The electronic device of the present disclosure may include, but is not limited to, a display device, a backlight device, an antenna device, a sensing device or a tiled device. The electronic device may be a bendable, flexible or rollable electronic device. The display device may include a non-self-luminous display device or a self-luminous display device, but not limited thereto. The display device may include, for example, a liquid crystal, a light-emitting diode, fluorescence materials, phosphor, quantum dots (QD), other suitable display media, or a combination of the foregoing. The antenna device may be a liquid crystal type antenna device or a non-liquid crystal type antenna device, and the sensing device may be a sensing device used for sensing capacitance, light, thermal energy or ultrasonic waves, but not limited thereto.

Electronic devices may include electronic elements, which may include passive elements and active elements, such as capacitors, resistors, inductors, diodes, transistors, etc. The diode may include a light-emitting diode or a photodiode, but not limited thereto. The light-emitting diode may include, for example, an organic light emitting diode (OLED), a mini LED, a micro LED or a quantum dot LED, but not limited thereto. The tiled device may be, for example, a display tiled device or an antenna tiled device, but not limited thereto. It should be noted that the electronic device (or display device) may be any combination of the foregoing, but not limited thereto. In addition, the shape of the electronic device (or display device) may be rectangular, circular, polygonal, a shape with curved edges or other suitable shapes. The electronic device (or display device) may have peripheral systems such as a driving system, a control system, a light source system, etc. to support the display device, antenna device, wearable device (e.g. including augmented reality or virtual reality function), vehicle-mounted device (e.g. applied to the automobile windshield) or tiled device.

A direction DR1, a direction DR2 and a direction DR3 are marked in the following figures. The direction DR3 may be a normal direction or a top view direction, as shown in FIG. 1, and the direction DR3 may be perpendicular to a surface 1001 of a substrate 100. The direction DR1 and the direction DR2 may be horizontal directions and those directions are perpendicular to the direction DR3. As shown in FIG. 1, the direction DR1 and the direction DR2 may be parallel to the surface 1001 of the substrate 100, and the direction DR1 may be perpendicular to the direction DR2. The spatial relationship of the structure in the following figures may be illustrated according to the direction DR1, the direction DR2 and the direction DR3.

Figure 2:
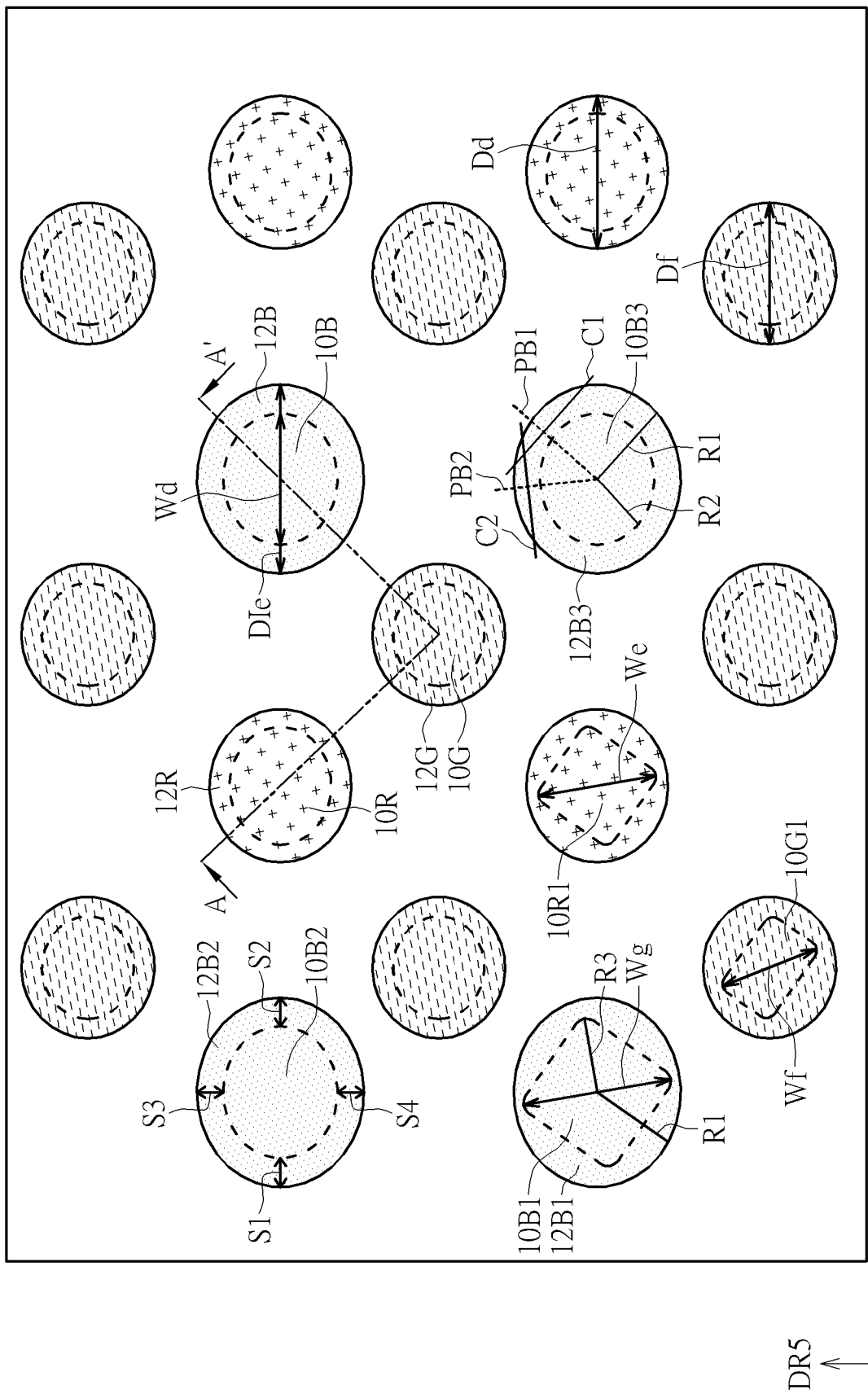
FIG. 2 is a schematic diagram illustrating a top view of the display device according to the first embodiment of the present disclosure.

Please refer to FIG. 1, which is a schematic diagram illustrating a cross-sectional view of a display device according to a first embodiment of the present disclosure, and FIG. 1 may correspond to the line A-A' in FIG. 2. The display device 1 may include the substrate 100, and the material of the substrate 100 may include glass, quartz, sapphire, rubber, stainless steel, polymers (such as polyimide (PI), polyethylene terephthalate (PET)) and/or other suitable materials. The substrate may be a flexible substrate or a rigid substrate, but not limited thereto. In addition, the substrate 100 may include the surface 1001, and the surface 1001 may be, for example, the upper surface of the substrate 100.

The display device 1 may include a plurality of light-emitting units and a plurality of color filters disposed on the surface 1001 of the substrate 100. A light-emitting unit 10R, a light-emitting unit 10G, a light-emitting unit 10B, a color filter 12R, a color filter 12G and a color filter 12B are shown in FIG. 1 and other figures for illustration, the light-emitting unit 10B may be the first light-emitting unit, the color filter 12B may be the first color filter, the second light-emitting unit may be the light-emitting unit 10R or the light-emitting unit 10G, and the second color filter may be the color filter 12R or the color filter 12G.

The structure of the display device 1 is described below with reference to FIG. 1. A buffer layer 102 may be disposed on the surface 1001 of the substrate 100, and a plurality of thin film transistors (TFTs) 104 may be disposed on the buffer layer 102. The thin film transistor 104 may include a gate GE, a source SE, a drain DE and a semiconductor layer SC. The semiconductor layer SC may be disposed on the buffer layer 102, an insulating layer IN1 may be disposed on the semiconductor layer SC, the gate GE may be disposed on the insulating layer IN1, and an insulating layer IN2 may be disposed on the gate GE. The source SE and the drain DE may be disposed on the insulating layer IN2 and electrically connected to the semiconductor layer SC. An insulating layer IN3 may be disposed on the source SE and the drain DE.

The thin film transistor 104 shown in FIG. 1 can be a top gate thin film transistor, but the thin film transistor 104 may also be a bottom gate thin film transistor or other types of thin film transistors. The material of the buffer layer 102 may include silicon oxide, silicon nitride, silicon oxynitride or a combination of the above, but not limited thereto. The materials of the gate GE, the source SE and the drain DE may include suitable conductive materials such as metals, but not limited thereto.

The material of the semiconductor layer SC may include low temperature polysilicon (LTPS), low temperature polysilicon oxide (LTPO), amorphous silicon (a-Si), germanium, compound semiconductors (such as gallium nitride, silicon carbide, gallium arsenide, gallium phosphide, indium phosphide, indium arsenide and/or indium antimonide), alloy semiconductors (such as SiGe alloy, GaAsP alloy, AlInAs alloy, AlGaAs alloy, GaInAs alloy, GaInP alloy or GaInAsP alloy), metal oxides (such as indium gallium zinc oxide (IGZO), indium zinc oxide (IZO), indium gallium zinc tin oxide (IGZTO)), organic semiconductors containing polycyclic aromatic compounds, or a combination of the above, but not limited thereto.

The region of the semiconductor layer SC overlapping the gate GE may be referred to as a channel region. The materials of the insulating layer IN1, the insulating layer IN2 and the insulating layer IN3 may include organic insulating materials, inorganic insulating materials or a combination of the above, but not limited thereto.

A plurality of electrodes 106 and an insulating layer IN4 may be disposed on the insulating layer IN3, and one of electrodes 106 is electrically connected to one of the thin film transistors 104 through a contact hole in the insulating layer IN3. In some embodiments, the light-emitting unit may be an organic light emitting diode, and the electrode 106 may be the anode of the organic light emitting diode, but not limited thereto. The material of the electrode 106 may include a suitable conductive material such as metal, but not limited thereto.

In some embodiments, the material of the insulating layer IN4 may include opaque organic insulating material, opaque inorganic insulating material or a combination of the above, but not limited thereto. In the present disclosure, the opaque organic insulating material may include black resin, but not limited thereto. In the present disclosure, the opaque inorganic insulating material may include chromium or chromium oxide, but not limited thereto.

As shown in FIG. 1, in the cross-sectional view, the insulating layer IN4 may include a plurality of partition walls PW1 disposed between the light-emitting unit 10R and the light-emitting unit 10G and between the light-emitting unit 10G and the light-emitting unit 10B, but not limited thereto. In some embodiments, the partition wall PW1 may be disposed between two of the light-emitting unit 10R, the light-emitting unit 10G and the light-emitting unit 10B.

The insulating layer IN4 may include a plurality of openings OPa disposed between the partition walls PW1 and correspondingly disposed on the electrodes 106, and the display device 1 includes a plurality of light-emitting layers 108 disposed in these openings OPa and disposed on the electrodes 106. The light-emitting layer 108 may include organic light emitting materials, quantum dot light emitting materials, other suitable materials, or combinations of the above, but not limited thereto. In some embodiments, the light-emitting layer 108 of the light-emitting unit 10B may emit blue light, the light-emitting layer 108 of the light-emitting unit 10G may emit green light, and the light-emitting layer 108 of the light-emitting unit 10R may emit red light, but not limited thereto.

An electrode 110 may be disposed on the light-emitting layers 108 and the insulating layer IN4, and the electrode 110 may be electrically connected to the light-emitting layers 108. In some embodiments, the light-emitting units may be organic light emitting diodes, and the electrode 110 may be a common cathode of the organic light emitting diodes, but not limited thereto. The material of the electrode 110 may include a transparent conductive material, but not limited thereto. In some embodiments, one of the light-emitting units may include one of the electrodes 106, at least a portion of the light-emitting layer 108 and a portion of the electrode 110, but not limited thereto.

The display device 1 may include an encapsulation layer 14 disposed on the light-emitting unit 10R, the light-emitting unit 10G and the light-emitting unit 10B. In some embodiments, the encapsulation layer 14 may be disposed on the electrode 110, but not limited thereto. The encapsulation layer 14 may be a thin film encapsulation (TFE) layer and may include a multilayer structure, but not limited thereto.

The encapsulation layer 14 may include an insulating layer IN5, an insulating layer IN6, an insulating layer IN7 and an insulating layer IN8 sequentially disposed on the light-emitting units, but not limited thereto. The insulating layer IN5 may be a capping layer, and the material of the insulating layer IN5 may include carbon, oxygen or a combination of the above, but not limited thereto. In addition, other insulating layers may be disposed between adjacent insulating layers shown in the figure. For example, oxygen containing unknown layer may be provided between the insulating layer IN5 and the insulating layer IN6, but not limited thereto.

The insulating layer IN6 may include a multilayer structure and may include a silicon oxynitride layer disposed between two silicon nitride layers, but not limited thereto. The thickness of the insulating layer IN6 may be greater than or equal to 0.5 μm and less than or equal to 1 μm, but not limited thereto.

The insulating layer IN7 may include an organic insulating material such as an acrylic material, but not limited thereto. The thickness of the insulating layer IN7 may be greater than or equal to 5 μm and less than or equal to 10 μm, but not limited thereto.

The insulating layer IN8 may include a multilayer structure, and the insulating layer IN8 may include a structure in which a silicon oxynitride layer, a silicon nitride layer, a silicon oxynitride layer and a silicon nitride layer are alternately stacked, but not limited thereto. The thickness of the insulating layer IN8 may be greater than or equal to 0.8 μm and less than or equal to 1.5 μm, but not limited thereto.

The display device 1 may include a plurality of touch sensing elements disposed on the encapsulation layer 14. A metal mesh touch sensing element is taken as an example as follows, but the touch sensing element of the present disclosure is not limited thereto. The touch sensing element may include a plurality of metal lines 112 in a plurality of sensing electrodes, and the touch sensing element may include a plurality of bridge lines 114 electrically connecting adjacent sensing electrodes. The bridge lines 114 may be disposed on the encapsulation layer 14. The thickness of the bridge line 114 may be greater than or equal to 0.2 μm and less than or equal to 0.5 μm, but not limited thereto.

An insulating layer IN9 may be disposed on the bridge lines 114, and the material of the insulating layer IN9 may include silicon nitride, but not limited thereto. The thickness of the insulating layer IN9 may be greater than or equal to 0.1 μm and less than or equal to 0.4 μm, but not limited thereto.

The metal lines 112 may be disposed on the insulating layer IN9, and the metal lines 112 and the bridge lines 114 may include a multilayer conductive structure of titanium/ aluminum/titanium, but not limited thereto. The metal lines 112 of adjacent sensing electrodes may be electrically connected to the bridge line 114 through the contact hole in the insulating layer IN9. The thickness of the metal lines 112 may be greater than or equal to 0.1 μm and less than or equal to 0.4 μm, but not limited thereto. In addition, an insulating layer IN10 may be disposed on the metal lines 112. The material of the insulating layer IN10 may include carbon, oxygen or a combination of the above, but not limited thereto.

In some embodiments, the thickness of the bridge lines 114 may be greater than the thickness of the metal lines 112. In some embodiments, the ratio of the thickness of the bridge lines 114 to the thickness of the metal lines 112 may be greater than or equal to 1 and less than or equal to 1.5.

The color filter 12R, the color filter 12G, the color filter 12B and an insulating layer IN11 may be disposed on the insulating layer IN10. The material of the insulating layer IN11 may include an opaque organic insulating material, an opaque inorganic insulating material or a combination of the above, but not limited thereto. As shown in FIG. 1, the insulating layer IN11 may include a plurality of partition walls PW2 disposed between the color filter 12R and the color filter 12G and between the color filter 12G and the color filter 12B, but not limited thereto. In some embodiments, the partition wall PW2 may be disposed between two of the color filter 12R, the color filter 12G and the color filter 12B.

The insulating layer IN11 may include a plurality of openings OPb disposed between the partition walls PW2 and correspondingly disposed on the light-emitting units, and the color filters may be disposed in these openings OPb and disposed on the light-emitting units. The color filters of the present disclosure may include quantum dots, fluorescent materials, phosphorescent materials, color filter layers, other suitable materials or combinations of the above, but not limited thereto.

As shown in FIG. 1, the color filter 12B may be disposed on the light-emitting unit 10B, and the color filter 12B may be blue or allow blue light to pass through. The color filter 12G may be disposed on the light-emitting unit 10G, and the color filter 12G may be green or allow green light to pass through. The color filter 12R may be disposed on the light-emitting unit 10R, and the color filter 12R may be red or allow red light to pass through. Therefore, the colors of the color filter 12R, the color filter 12G and the color filter 12B may be different from each other. The display device 1 of the present disclosure may reduce the reflected light generated by the ambient light by the color filters, and the color purity of different colors of light can be improved, thereby improving the display quality.

In the cross-sectional view of the display device 1 shown in FIG. 1, the color filter 12B and the light-emitting unit 10B are taken as an example, two oblique lines from the center of the light-emitting unit 10B to two ends of the bottom surface of the color filter 12B and a vertical line from the center of the light-emitting unit 10B to the bottom surface of the color filter 12B may have two included angles. One of the included angles may have an angle θa, and the angle θa may be calculated by trigonometric function.

For example, the color filter 12B may have a width Wa, and the width Wa may be the width of the bottom surface of the color filter 12B in the cross-sectional view. In addition, since the widths of the color filters in different cross-sectional views may be different, and the maximum width of the bottom surface of the color filter may be defined as the width of the color filter in the present disclosure. In the direction DR3, a distance Da may be included between the color filter 12B and the light-emitting unit 10B, and the distance Da may be the distance between the bottom surface of the color filter 12B and the uppermost surface of the light-emitting unit 10B (such as the upper surface of the electrode 110). Therefore, the angle θa may be obtained by trigonometric function as $\tan^{-1}[(Wa/2)/Da]$ (or may correspond to $\tan^{-1}[(W1/2)/D1]$ in the claims).

Through the above method, the angle θb corresponding to the color filter 12G and the light-emitting unit 10G may also be obtained as $\tan^{-1}[(Wb/2)/Db]$ (or may correspond to $\tan^{-1}[(W2/2)/D2]$ in the claims), the width Wb may be the width of the bottom surface of the color filter 12G in the cross-sectional view, and the distance Db may be the distance between the color filter 12G and the light-emitting unit 10G.

In addition, the angle θc corresponding to the color filter 12R and the light-emitting unit 10R may also be obtained as $\tan^{-1}[(Wc/2)/Dc]$ (or may correspond to $\tan^{-1}[(W2/2)/D2]$ in the claims), the width Wc may be the width of the bottom surface of the color filter 12R in the cross-sectional view, and the distance Dc may be the distance between the color filter 12R and the light-emitting unit 10R.

The angle θa may be greater than or equal to 28° and less than or equal to 61°, that is, the width Wa and the distance Da may satisfy [equation a]: $28° \leq \tan^{-1}[(Wa/2)/Da] \leq 61°$. In some embodiments, the angle θa may be greater than or equal to 34° and less than or equal to 50°.

The angle θb may be greater than or equal to 22° and less than or equal to 56°, that is, the width Wb and the distance Db may satisfy [equation b]: $22° \leq \tan^{-1}[(Wb/2)/Db] \leq 56°$. In some embodiments, the angle θb may be greater than or equal to 27° and less than or equal to 45°.

The angle θc may be greater than or equal to 23° and less than or equal to 58°, that is, the width Wc and the distance Dc may satisfy [equation c]: $23° \leq \tan^{-1}[(Wc/2)/Dc] \leq 58°$. In some embodiments, the angle θc may be greater than or equal to 28° and less than or equal to 47°.

The angle θa may be greater than the angle θb, and the width Wa, the width Wb, the distance Da and the distance Db may satisfy [equation d]: $\tan^{-1}[(Wa/2)/Da] > \tan^{-1}[(Wb/2)/Db]$. The angle θa may be greater than the angle θc, and the width Wa, the width Wc, the distance Da and the distance Dc may satisfy [equation e]: $\tan^{-1}[(Wa/2)/Da] > \tan^{-1}[(Wc/2)/Dc]$.

In some embodiments, the angle θa may be greater than the angle θc, and the angle θc may be greater than the angle θb. In some embodiments, the ratio of the angle θa, the angle θb and the angle θc may be θc:θa:θb=1.04:(1.13~1.26):1. In addition, the angle θa, the angle θb and the angle θc may differ from each other within 10°, for example, the width Wa, the width Wb, the distance Da and the distance Db may satisfy [equation f]: $0° \leq \tan^{-1}[(Wa/2)/Da] - \tan^{-1}[(Wb/2)/Db] \leq 10°$.

Please refer to FIG. 2, which is a schematic diagram illustrating a top view of the display device according to the first embodiment of the present disclosure. In the top view of the display device 1, the outlines of the color filter and the light-emitting unit may be the outermost boundaries of the color filter and the light-emitting unit, and the areas of the color filter and the light-emitting unit may be obtained according to the outlines of the color filter and the light-emitting unit. In addition, the outline of an element may also correspond to the edge of the bottom of the element in the cross-sectional view.

The area of the color filter 12B may be greater than the area of the color filter 12G, and the area of the color filter 12B may be greater than the area of the color filter 12R. In some embodiments, the area of the color filter 12B may be greater than the area of the color filter 12R, and the area of the color filter 12R may be greater than the area of the color filter 12G. For example, the ratio of the area of the color filter 12R, the area of the color filter 12B and the area of the color filter 12G may be 1.1:1.65:1.

The area of color filter 12R may be greater than or equal to 300 $\mu m^2$ and less than or equal to 500 $\mu m^2$, the area of color filter 12B may be greater than or equal to 600 $\mu m^2$ and less than or equal to 700 $\mu m^2$, and the area of color filter 12G may be greater than or equal to 300 $\mu m^2$ and less than or equal to 400 $\mu m^2$. For example, the area of the color filter 12R may be 377 $\mu m^2$, the area of the color filter 12B may be 571 $\mu m^2$, and the area of the color filter 12G may be 345 $\mu m^2$, but not limited thereto.

The white point coordinates in the chromaticity diagram may shift when the display device 1 generates the reflected light due to the ambient light. The problem of the shift of the white point coordinates may be solved by increasing the area of the color filter or the angle corresponding to the color filter and the light-emitting unit. For example, since the reflectivity of blue reflected light is low, the intensity of blue reflected light is weaker than the intensities of red reflected light and green reflected light, which makes the image yellow and shifts the white point coordinates in the chromaticity diagram. Therefore, the blue reflected light has the greatest influence on the color of the image. However, in the present disclosure, the intensity of blue reflected light may be increased to correct the shift of the white point coordinates (since the relationship between the white point coordinate and the angle θa is the greatest) by increasing the area of the color filter 12R or the angle θa corresponding to the color filter 12B and the light-emitting unit 10B, and an image with accurate color may be displayed.

Please continue to refer to FIG. 2, taking the color filter 12B and the light-emitting unit 10B as an example, the ratio of the area of the color filter 12B to the area of the light-emitting unit 10B may be greater than or equal to 1.2 and less than or equal to 9. The color filter 12G and the light-emitting unit 10G may also have the above-mentioned ratio range of areas, and the color filter 12R and the light-emitting unit 10R may also have the above-mentioned ratio range of areas.

For example, the ratio of the area of the color filter 12R to the area of the light-emitting unit 10R may be 2.06, the ratio of the area of the color filter 12B to the area of the light-emitting unit 10B may be 1.88, and the ratio of the area of the color filter 12G to the area of the light-emitting unit 10G may be 2.06, but not limited thereto.

Taking the color filter 12B and the light-emitting unit 10B as an example, the ratio of the width Wa of the color filter 12B (as shown in FIG. 1) to a width Wd of the light-emitting unit 10B may be greater than or equal to 1.2 and less than or equal to 9. The color filter 12G and the light-emitting unit 10G may also have the above-mentioned ratio range of widths, and the color filter 12R and the light-emitting unit 10R may also have the above-mentioned ratio range of widths.

In addition, the width Wd of the light-emitting unit 10B may be the width of the light-emitting area. Since the widths of light-emitting units in different directions may be different, the maximum width in the light-emitting area of the light-emitting unit is defined as the width of the light-emitting unit in the present disclosure.

Taking a light-emitting unit 10R1, a light-emitting unit 10G1 and a light-emitting unit 10B1 at the bottom left of FIG. 2 as an example. The shapes of the light-emitting unit 10R1, the light-emitting unit 10G1 and the light-emitting unit 10B1 may be rectangles with arc angles instead of circles, and a width We of the light-emitting unit 10R1, a width Wf of the light-emitting unit 10G1 and a width Wg of the light-emitting unit 10B1 may all be the maximum widths in the light-emitting areas. The light-emitting unit of the present disclosure may also have other shapes.

Figure 3:
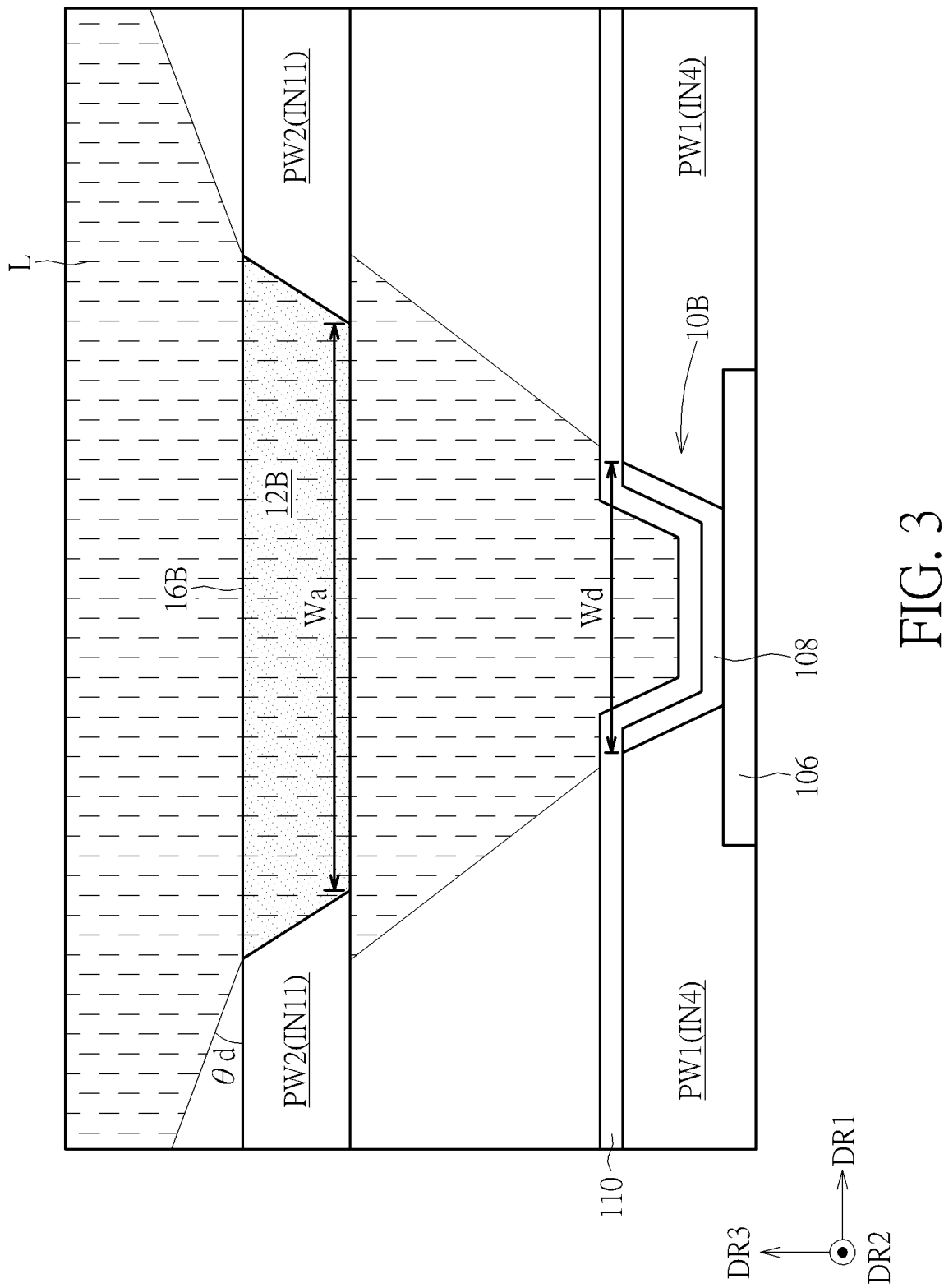
FIG. 3 is a schematic diagram illustrating the light distribution of a display device according to an embodiment of the present disclosure.

Please refer to FIG. 3, which is a schematic diagram illustrating the light distribution of a display device according to an embodiment of the present disclosure. In this embodiment, the ratio of the area of the color filter 12B to the area of the light-emitting unit 10B may be 9, and the ratio of the width Wa of the color filter 12B to the width Wd of the light-emitting unit 10B may be 3, but not limited thereto. When the ratio of the area of the color filter (such as the color filter 12R, color filter 12G or color filter 12B) to the area of the light-emitting unit (such as the light-emitting unit 10R, light-emitting unit 10G or light-emitting unit 10B) or the ratio of the width of the color filter to the width of the light-emitting unit is less than 1.2, more than 50% of the light L of the light-emitting unit is blocked by the partition walls PW2, resulting in low light utilization rate and low brightness of display device 1.

When the ratio of the area of the color filter to the area of the light-emitting unit or the ratio of the width of the color filter to the width of the light-emitting unit is greater than 9, the light utilization rate cannot be further improved effectively, thus further increasing the area of the color filter 12B may only be a waste of space and may excessively compresses the space where the partition walls PW2 can be disposed.

Referring to FIG. 2 again, in the top view of the display device 1, the outline of the color filter 12B may have a curve, the outline of the light-emitting unit 10B may be surrounded by the outline of the color filter 12B, and the outline of the color filter 12B may be similar to the outline of the light-emitting unit 10B. The term "similar outline" may mean that two boundaries may be parallel to each other or there may be a constant distance between two boundaries. For example, the outline of the color filter 12B and the outline of the light-emitting unit 10B may be circles, but not limited thereto. The color filter 12R, the color filter 12G, the light-emitting unit 10R, and the light-emitting unit 10G may also have the same features as above.

When the outline of the color filter is a circle, the light from the light-emitting unit may be more uniform after passing through the color filter. Compared with other shapes, when the opening of the insulating layer IN11 used to form the color filter is circular, the material of the color filter may uniformly fill the opening in the ink-jet printing process.

In some embodiments, a diameter Dd of the color filter 12R, a diameter DIe of the color filter 12B and a diameter Df of the color filter 12G may be 1.04:1.28:1 (i.e., Dd:DIe:Df). For example, the diameter Dd of the color filter 12R may be 22 μm, the diameter DIe of the color filter 12B may be 27 μm, and the diameter Df of the color filter 12G may be 21 μm, but not limited thereto.

Taking the color filter 12B2 and the light-emitting unit 10B2 on the left side of FIG. 2 as an example, the leftmost end of the outline of the color filter 12B2 and the leftmost end of the outline of the light-emitting unit 10B2 have a distance Si in a direction DR4, and the rightmost end of the outline of the color filter 12B2 and the rightmost end of the outline of the light-emitting unit 10B2 have a distance S2 in the direction DR4. The uppermost end of the outline of the color filter 12B2 and the uppermost end of the outline of the light-emitting unit 10B2 have a distance S3 in a direction DR5, while the lowermost end of the outline of the color filter 12B2 and the lowermost end of the outline of the light-emitting unit 10B2 have a distance S4 in the direction DR5.

The direction DR4 and the direction DR5 may be horizontal directions and those directions are perpendicular to the direction DR3, and the direction DR4 may be perpendicular to the direction DR5. For example, the direction DR4 and the direction DR5 may be parallel to the surface 1001 of the substrate 100. In addition, the direction DR4 and the direction DR5 may be different from the direction DR1 and the direction DR2.

The ratio of any two of the distance S1, the distance S2, the distance S3 and the distance S4 may be greater than or equal to 0.9 and less than or equal to 1.1. When the ratio is within this range, the light from the light-emitting unit 10B2 may be more uniform after passing through the color filter 12B2. The color filter 12R, the color filter 12G, the light-emitting unit 10R, and the light-emitting unit 10G may also have the same features as above.

Taking the color filter 12B3 and the light-emitting unit 10B3 in FIG. 2 as an example, the outline of the color filter 12B3 and the outline of the light-emitting unit 10B3 may be circles, the color filter 12B3 may have a curvature radius R1, and the light-emitting unit 10B3 may have a curvature radius R2, and the curvature radius R1 and the curvature radius R2 may be the same, but not limited thereto. The color filter 12R, the color filter 12G, the light-emitting unit 10R, and the light-emitting unit 10G may also have the same features as above.

In some embodiments, the curvature radius R1 of the curve in the outline of the color filter 12B3 may be greater than or equal to 8 μm and less than or equal to 22 μm, but not limited thereto. The color filter 12R and the color filter 12G may also have the same features as above.

For example, a chord C1 and a chord C2 may be drawn on the outline of the color filter 12B3, the perpendicular bisector PB1 of the chord C1 and the perpendicular bisector PB2 of the chord C2 may intersect at the center of the circle of the outline of the color filter 12B, and the curvature radius R1 may be obtained through the center of the circle. The curvature radius of other color filters and light-emitting units may be obtained by the above method.

Taking the color filter 12B1 and the light-emitting unit 10B1 in FIG. 2 as an example, the arc angle of the rectangular outline of the light-emitting unit 10B1 may have a curvature radius R3, and the curvature radius R3 may be different from the curvature radius R1 of the color filter 12B1. The curvature radius of the arc angle of the light-emitting unit 10B1 may be greater than the curvature radius of the arc angle of the light-emitting unit 10G1, or the curvature radius of the arc angle of the light-emitting unit 10B1 may be greater than the curvature radius of the arc angle of the light-emitting unit 10R1, but not limited thereto.

Referring to FIG. 1 again, the color filter 12R may have an upper surface 16R, the color filter 12G may have an upper surface 16G, the color filter 12B may have an upper surface 16B, and the upper surface 16R, the upper surface 16G and the upper surface 16B may be curved surfaces, but not limited thereto. The curvature radii of the upper surface 16R, the upper surface 16G and the upper surface 16B may be different from each other, but not limited thereto. The curvature radius of the upper surface 16R may be greater than the curvature radius of the upper surface 16G, and the curvature radius of the upper surface 16G may be greater than the curvature radius of the upper surface 16B, but not limited thereto.

Figure 4:
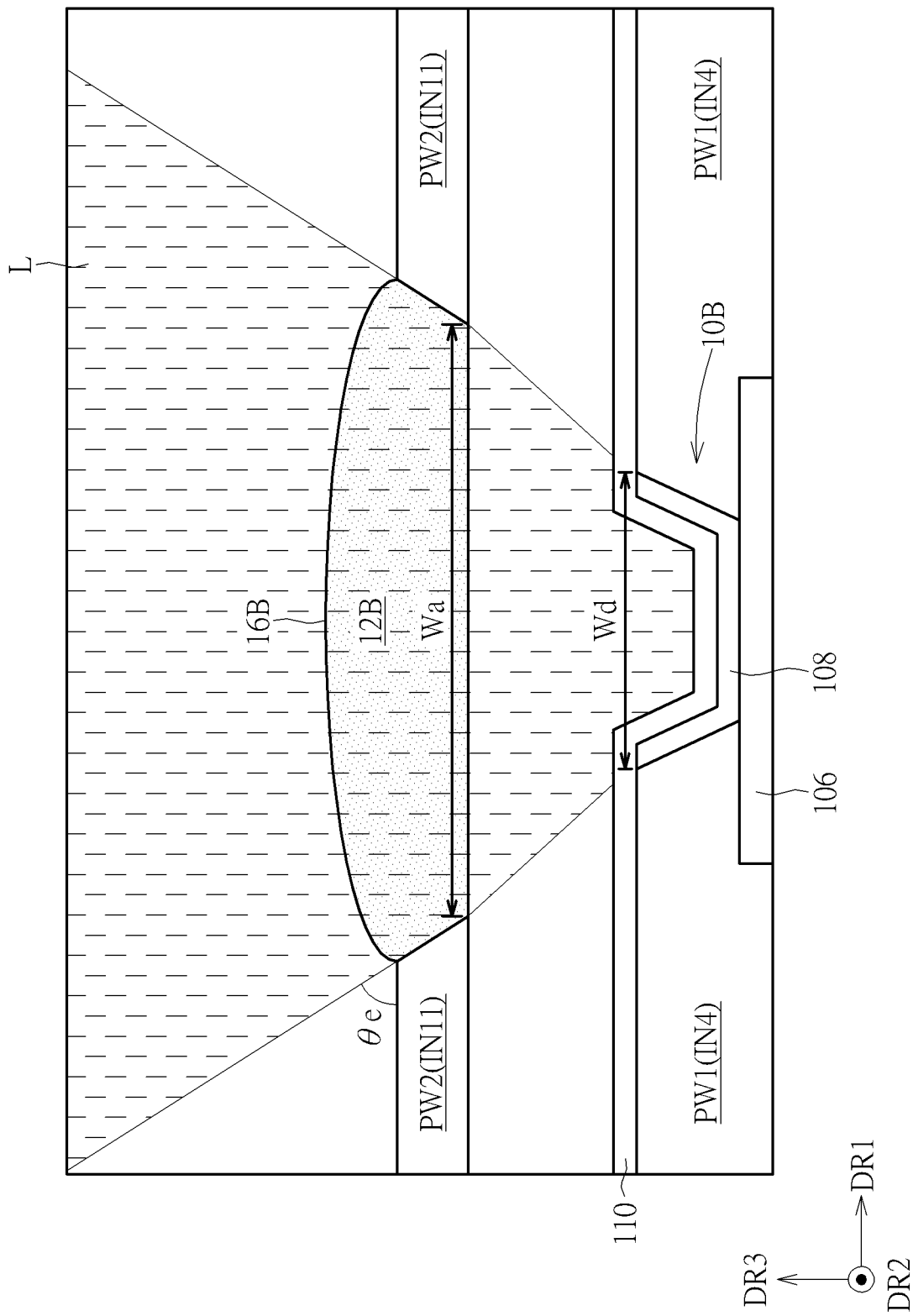
FIG. 4 is a schematic diagram illustrating the light distribution of a display device according to another embodiment of the present disclosure.

Please refer to FIG. 4, which is a schematic diagram illustrating the light distribution of a display device according to another embodiment of the present disclosure. In the embodiment of FIG. 4, the upper surface 16B of the color filter 12B may be curved, and the outermost boundary of the light L emitted by the color filter 12B and the upper surface of the partition wall PW2 may have an angle θe. In the embodiment of FIG. 3, the upper surface 16B of the color filter 12B may be flat, and the outermost boundary of the light L emitted by the color filter 12B and the upper surface of the partition wall PW2 may have an angle θd. The angle θe may be greater than the angle θd, that is, when the upper surface of the color filter is curved, the light emitted by the color filter may be more concentrated.

Referring to FIG. 1 again, the partition wall PW2 may have a side surface 118S and a bottom surface 118B. The side surface 118S may be adjacent to a color filter (such as the color filter 12B), and the bottom surface 118B may be connected to the side surface 118S, and an angle θf is included between the side surface 118S and the bottom surface 118B.

The definition of the angle θf of the partition wall PW2 is described below. A point Q1 and a point Q2 are defined on the side surface 118S. The point Q1 corresponds to half of the total height of the partition wall PW2 (e.g., the thickness T2), and the point Q2 corresponds to one tenth of the total height of the partition wall PW2. A virtual line V1 may pass through the point Q1 and the point Q2, and the angle between the virtual line V1 and the bottom surface 118B may be defined as the angle θf.

The partition wall PW1 may have a side surface 116S and a bottom surface 116B. The side surface 116S may be adjacent to the light-emitting unit (such as the light-emitting unit 10B), and the bottom surface 116B may be connected to the side surface 116S, and an angle θg is included between the side surface 116S and the bottom surface 116B. In other embodiments, the bottom surface 116B may be directly or indirectly connected to the side surface 116S.

In some embodiments, the electrode 106 may be disposed between the side surface 116S and the bottom surface 116B. Taking the light-emitting unit 10B as an example, at least a portion of the side surface 116S may be adjacent to the light-emitting layer 108 of the light-emitting unit 10B and may be inclined, a virtual line V3 of the portion of the side surface 116S may be defined by the above method, and another virtual line V5 is parallel to the bottom surface 116B. In addition, the angle between the virtual line V3 of the side surface 116S and the virtual line V5 parallel to the bottom surface 116B may be defined as an angle θg.

In some embodiments, the ratio of the angle θg to the angle θf may be greater than or equal to 0.8 and less than or equal to 1.2. When the ratio of the angle θg to the angle θf is greater than 1.2, the improvement of the light extraction efficiency is not significant. When the ratio of the angle θg to the angle θf is less than 0.8, the partition wall PW2 blocks a portion of the light from the light-emitting unit, thereby reducing the light extraction efficiency.

The partition wall PW1 may have a thickness T1, the partition wall PW2 may have a thickness T2, and these thicknesses may be maximum thicknesses of the partition walls. The ratio of the thickness T2 to the thickness T1 may be greater than or equal to 0.7 and less than or equal to 1.3.

For example, the thickness T2 may be greater than or equal to 0.5 µm and less than or equal to 6 µm, but not limited thereto.

The color filter (such as the color filter 12B of FIG. 1) may have a thickness T3, and the thickness may be a maximum thickness of the color filter. The ratio of the thickness T3 to the thickness T2 may be greater than or equal to 0.5 and less than or equal to 1.5.

An insulating layer IN12 may be disposed on the color filters and the insulating layer IN11, and an adhesive layer 120 may be disposed on the insulating layer IN12. The material of the insulating layer IN12 may include an organic insulating material, an inorganic insulating material or a combination of the above, but not limited thereto.

The display device 1 may include a cover glass CG disposed on the color filter 12R, the color filter 12G and the color filter 12B. In some embodiments, the cover glass CG may include an insulating layer IN13, an insulating layer IN14, an insulating layer IN15 and an insulating layer IN16 sequentially disposed on the color filters, but not limited thereto.

The insulating layer IN13 may be disposed on the adhesive layer 120, and the insulating layer IN13 may include colorless polyimide (CPI) or other suitable insulating materials, but not limited thereto. The insulating layer IN14 may be disposed on the insulating layer IN13, and the insulating layer IN14 may include acrylate or other suitable insulating materials, but not limited thereto.

The insulating layer IN15 may be disposed on the insulating layer IN14, and the insulating layer IN15 may include polyethylene terephthalate or other suitable insulating materials, but not limited thereto. The insulating layer IN16 may be disposed on the insulating layer IN15, and the insulating layer IN16 may be a hard coating and may include poly (methyl methacrylate) (PMMA) or other suitable insulating materials, but not limited thereto.

The display device of the present disclosure is not limited to the above embodiment. The following will continue to disclose other embodiments of the present disclosure. However, in order to simplify the description and highlight the differences between the embodiments, the same reference numerals are used to denote the same elements hereinafter, and the repeated portions will not be described again.

Figure 5:
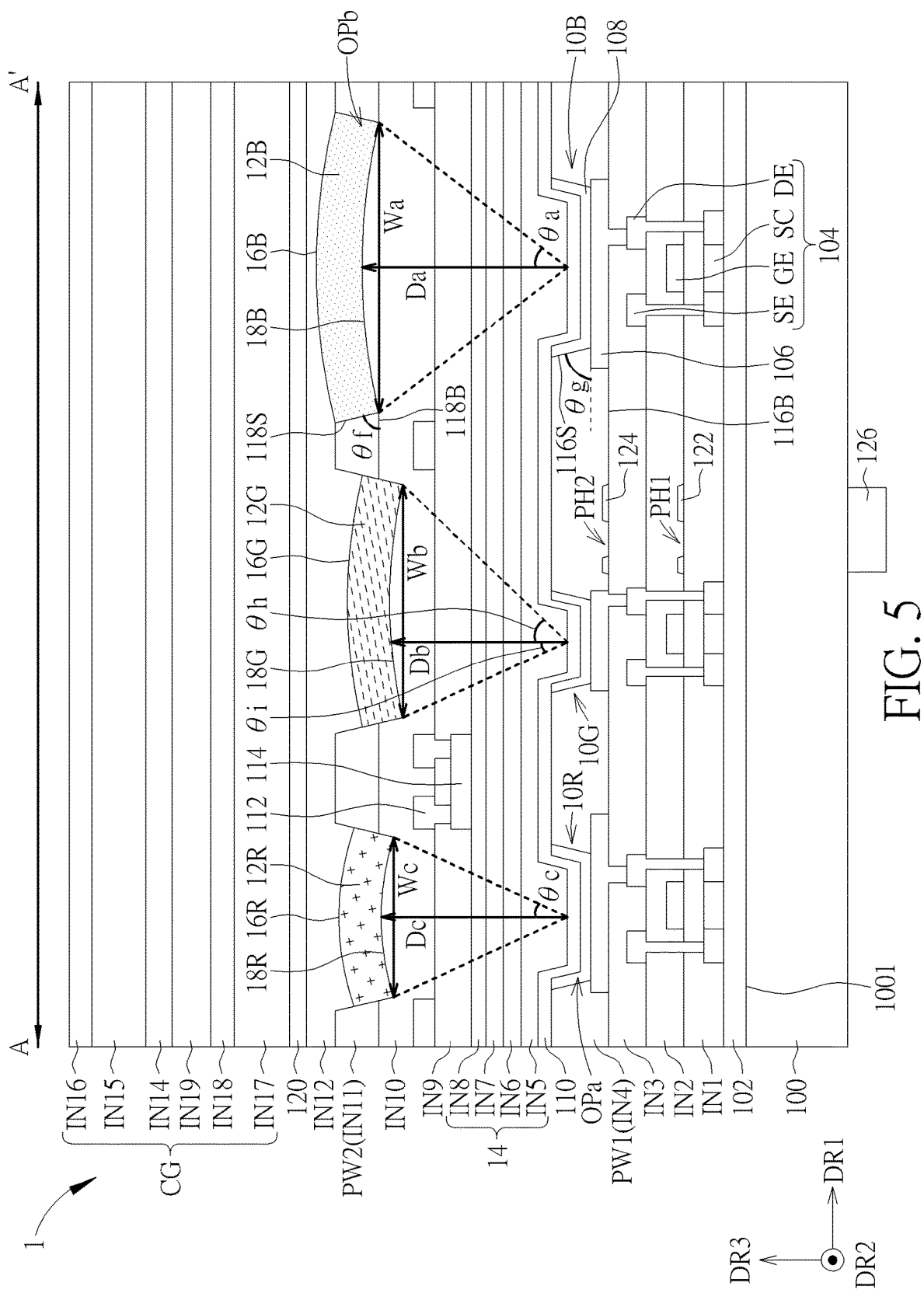
FIG. 5 is a schematic diagram illustrating a cross-sectional view of a display device according to a second embodiment of the present disclosure.

Please refer to FIG. 5, which is a schematic diagram illustrating a cross-sectional view of a display device according to a second embodiment of the present disclosure. In some embodiments, the color filter 12R may have a lower surface 18R opposite to the upper surface 16R, the color filter 12G may have a lower surface 18G opposite to the upper surface 16G, the color filter 12B may have a lower surface 18B opposite to the upper surface 16B, and the lower surface 18R, the lower surface 18G and the lower surface 18B may be curved surfaces, but not limited thereto. The curvature radii of the lower surface 18R, the lower surface 18G and the lower surface 18B may be different from each other, but not limited thereto. The curvature radius of the lower surface 18R may be greater than the curvature radius of the lower surface 18G, and the curvature radius of the lower surface 18G may be greater than the curvature radius of the lower surface 18B, but not limited thereto. The measurement method of curvature radius may be the same as the measurement method of curvature radius R1 in FIG. 2.

Any two of the distance Da, the distance Db and the distance Dc may be different from each other, or the distance Da, the distance Db and the distance Dc may all be different. For example, the distance Da may be greater than the distance Dc, and the distance Dc may be greater than the distance Db, but not limited thereto. For example, the distance Da, the distance Db or the distance Dc may be adjusted by forming recesses with different depths in the insulating layer IN10. The angle θa, the angle θb and the angle θc may also be adjusted by adjusting the distance Da, the distance Db and the distance Dc.

Taking the color filter 12G and the light-emitting unit 10G as an example, two oblique lines from the center of the light-emitting unit 10G to two ends of the bottom surface of the color filter 12G and a vertical line from the center of the light-emitting unit 10G to the bottom surface of the color filter 12G may have an angle θh and an angle θi, and the angle θh is different from the angle θi. For example, the angle θh may be greater than the angle θi, but not limited thereto. This feature may also be applied to the color filter 12R and the light-emitting unit 10R, or applied to the color filter 12B and the light-emitting unit 10B.

In some embodiments, the display device 1 may further include a shielding layer 122, a shielding layer 124 and a sensor 126. The shielding layer 122 may be disposed on the insulating layer IN1 and may have a pinhole PH1, the shielding layer 124 may be disposed on the insulating layer IN3 and may have a pinhole PH2, the sensor 126 may be disposed under the substrate 100, and the color filter 12G, the pinhole PH1, the pinhole PH2 and the sensor 126 may be overlapped in the direction DR3.

In some embodiments, since the sensor 126 is sensitive to green light, the pinhole PH1, the pinhole PH2 and the sensor 126 are disposed under the color filter 12G, and the sensor 126 may receive green light to provide the sensing function. In addition, the metal lines 112, the bridge lines 114 and other opaque portions in the touch sensing elements may not overlap the pinhole PH1, the pinhole PH2 and the sensor 126 in the direction DR3, thus the amount of light that should be received by the sensor 126 but blocked by the metal lines 112 and the bridge lines 114 can be reduced.

The materials of the shielding layer 122 and the shielding layer 124 may include metal or other suitable opaque conductive materials, but not limited thereto. In some embodiments, the material of the insulating layer IN4 may include a transparent organic insulating material, a transparent inorganic insulating material or a combination of the above, but not limited thereto. The sensor of the present disclosure may include an optical sensor, but not limited thereto. The sensor of the present disclosure may be used to sense fingerprints, but not limited thereto.

In some embodiments, the cover glass CG may include an insulating layer IN17, an insulating layer IN18, an insulating layer IN19, the insulating layer IN14, the insulating layer IN15 and the insulating layer IN16 sequentially disposed on the color filters. The insulating layer IN17 may be disposed on the adhesive layer 120, the insulating layer IN18 may be disposed on the insulating layer IN17, and the insulating layer IN19 may be disposed on the insulating layer IN18.

The insulating layer IN17 may include polyethylene terephthalate or other suitable insulating materials, but not limited thereto. The insulating layer IN18 may include acrylate or other suitable insulating materials, but not limited thereto. The insulating layer IN19 may include ultra-thin glass (UTG) or other suitable insulating materials, but not limited thereto.

Figure 6:
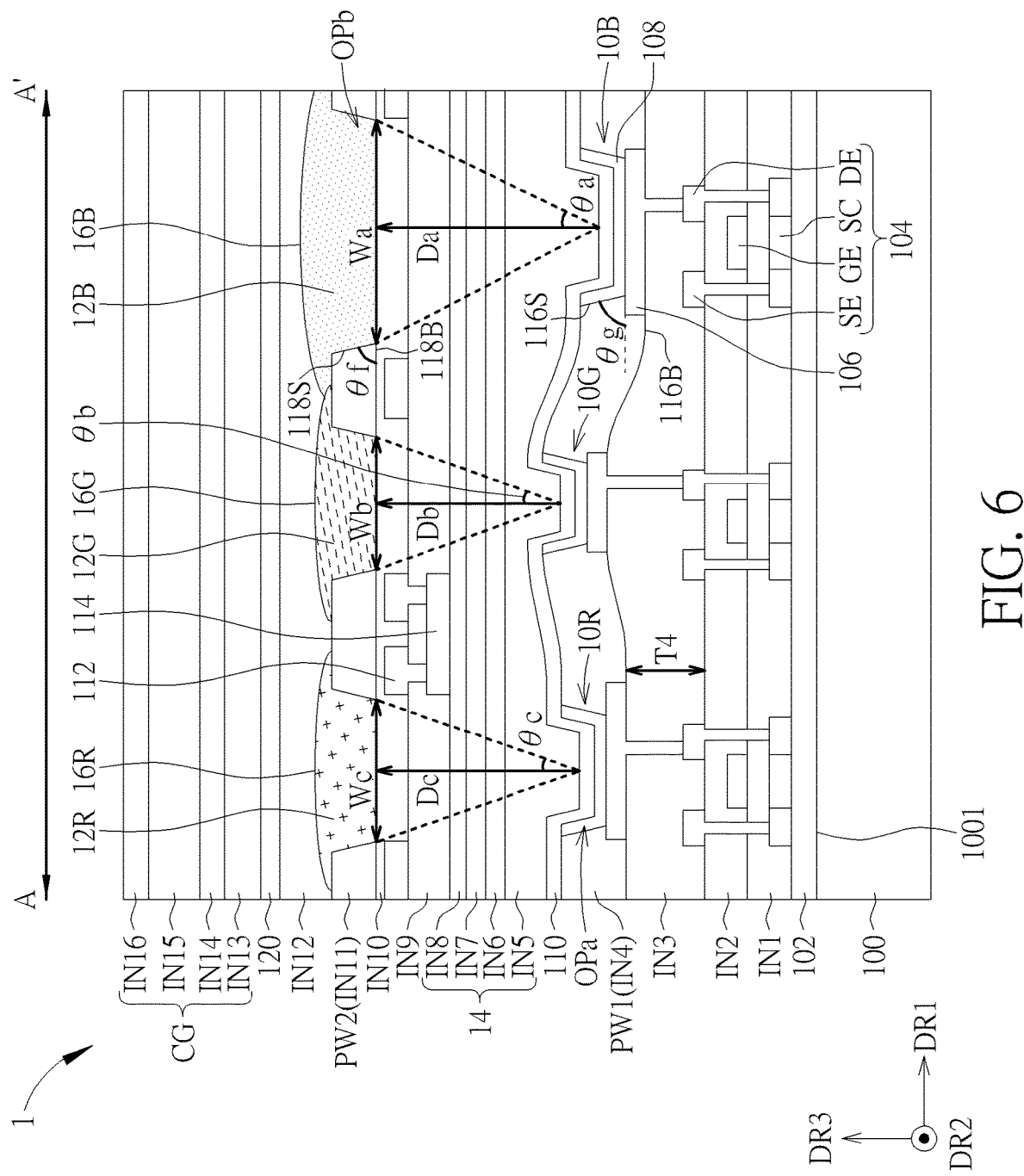
FIG. 6 is a schematic diagram illustrating a cross-sectional view of a display device according to a third embodiment of the present disclosure.

Please refer to FIG. 6, which is a schematic diagram illustrating a cross-sectional view of a display device according to a third embodiment of the present disclosure. In some embodiments, a thickness T4 may be different in different portions of the insulating layer IN3. Therefore, the distance Da, the distance Db and the distance Dc may be adjusted by adjusting the thickness T4 of different portions of the insulating layer IN3, and the angle θa, the angle θb and the angle θc may also be adjusted.

The insulating layer IN3 may have an upper surface that fluctuates up and down, and the insulating layer IN4 and the light-emitting unit 10R, the light-emitting unit 10G and the light-emitting unit 10B may be conformally formed on the upper surface of the insulating layer IN3. For example, the insulating layer IN3 with different thicknesses T4 may be formed by using a halftone mask and the photolithography and etching process, but not limited thereto.

In some embodiments, the color filter 12R, the color filter 12G and the color filter 12B respectively may be disposed on a portion of the upper surface of the adjacent partition wall PW2, but not limited thereto. In addition, the color filter 12B may be disposed on a portion of the upper surface of the adjacent color filter (such as the color filter 12G), but not limited thereto.

Figure 7:
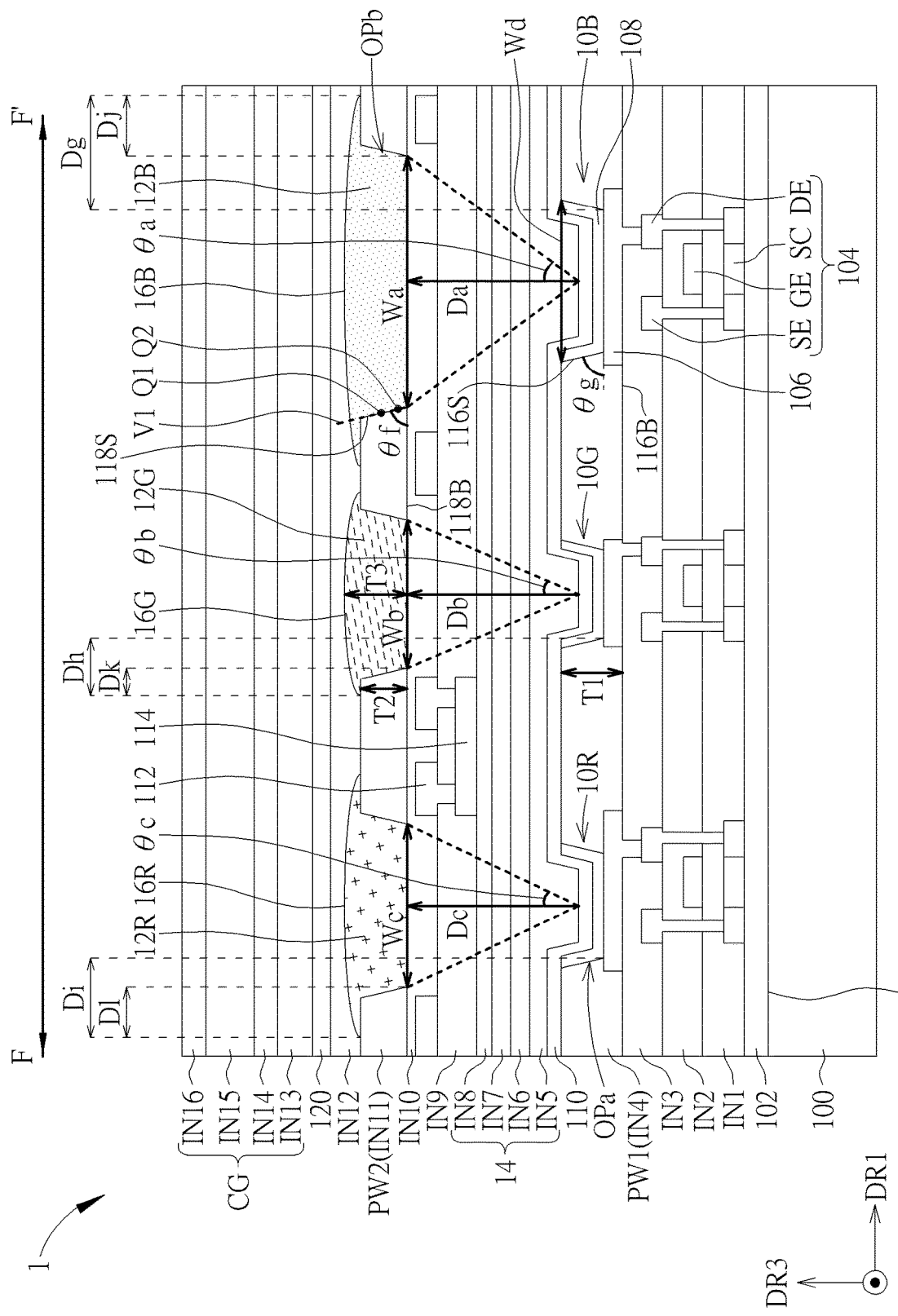
FIG. 7 is a schematic diagram illustrating a cross-sectional view of a display device according to a fourth embodiment of the present disclosure.
Figure 8:
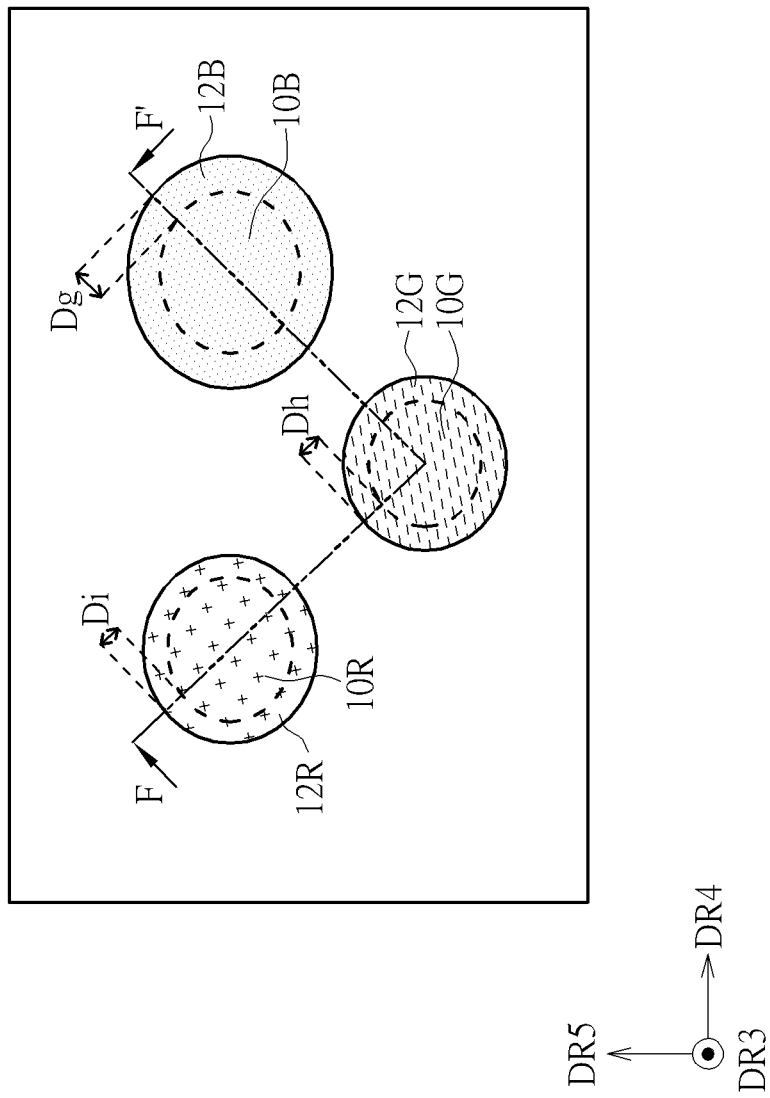
FIG. 8 is a schematic diagram illustrating a top view of the display device according to the fourth embodiment of the present disclosure.

Please refer to FIG. 7 and FIG. 8, FIG. 7 is a schematic diagram illustrating a cross-sectional view of a display device according to a fourth embodiment of the present disclosure, and FIG. 8 is a schematic diagram illustrating a top view of the display device according to the fourth embodiment of the present disclosure. FIG. 7 may correspond to the line F-F' in FIG. 8. In some embodiments (as shown in FIG. 7), the color filter 12R, the color filter 12G and the color filter 12B respectively may be disposed on a portion of the upper surface of the adjacent partition wall PW2. As shown in FIG. 7 and FIG. 8, a distance Dg may be included between the color filter 12B and the light-emitting unit 10B, a distance Dh may be included between the color filter 12G and the light-emitting unit 10G, and a distance Di may be included between the color filter 12R and the light-emitting unit 10R. The distance Dg may be greater than the distance Di, and the distance Di may be greater than the distance Dh, but not limited thereto. As shown in FIG. 7, the distance between the color filter and the light-emitting unit may be the distance between the end of the color filter and the end of the bottom surface of the light-emitting layer 108 of the light-emitting unit on the same side in the direction DR1, and the bottom surface of the light-emitting layer 108 of the light-emitting unit is overlapped with the electrode 110, the light-emitting layer 108 and the electrode 106. That is, the distance between the color filter and the light-emitting unit may be the distance between the end of the color filter and the end of the light-emitting area of the light-emitting unit.

Therefore, the difference between the area of the color filter 12B and the area of the light-emitting unit 10B may be greater than the difference between the area of the color filter 12R and the area of the light-emitting unit 10R, and the difference between the area of the color filter 12R and the area of the light-emitting unit 10R may be greater than the difference between the area of the color filter 12G and the area of the light-emitting unit 10G.

In addition, a distance Dj of the color filter 12B overlapping the adjacent partition wall PW2 may be greater than a distance Dl of the color filter 12R overlapping the adjacent partition wall PW2, and the distance Dl of the color filter 12R overlapping the adjacent partition wall PW2 may be greater than a distance Dk of the color filter 12G overlapping the adjacent partition wall PW2. The distance of the color filter overlapping the partition wall PW2 may be the distance between the end of the color filter and the end of the bottom surface of the partition wall PW2 on the same side in the direction DR1.

Therefore, the area of the color filter 12B overlapping the adjacent partition wall PW2 may be greater than the area of the color filter 12R overlapping the adjacent partition wall PW2, and the area of the color filter 12R overlapping the adjacent partition wall PW2 may be greater than the of the color filter 12G overlapping area the adjacent partition wall PW2.

Figure 9:
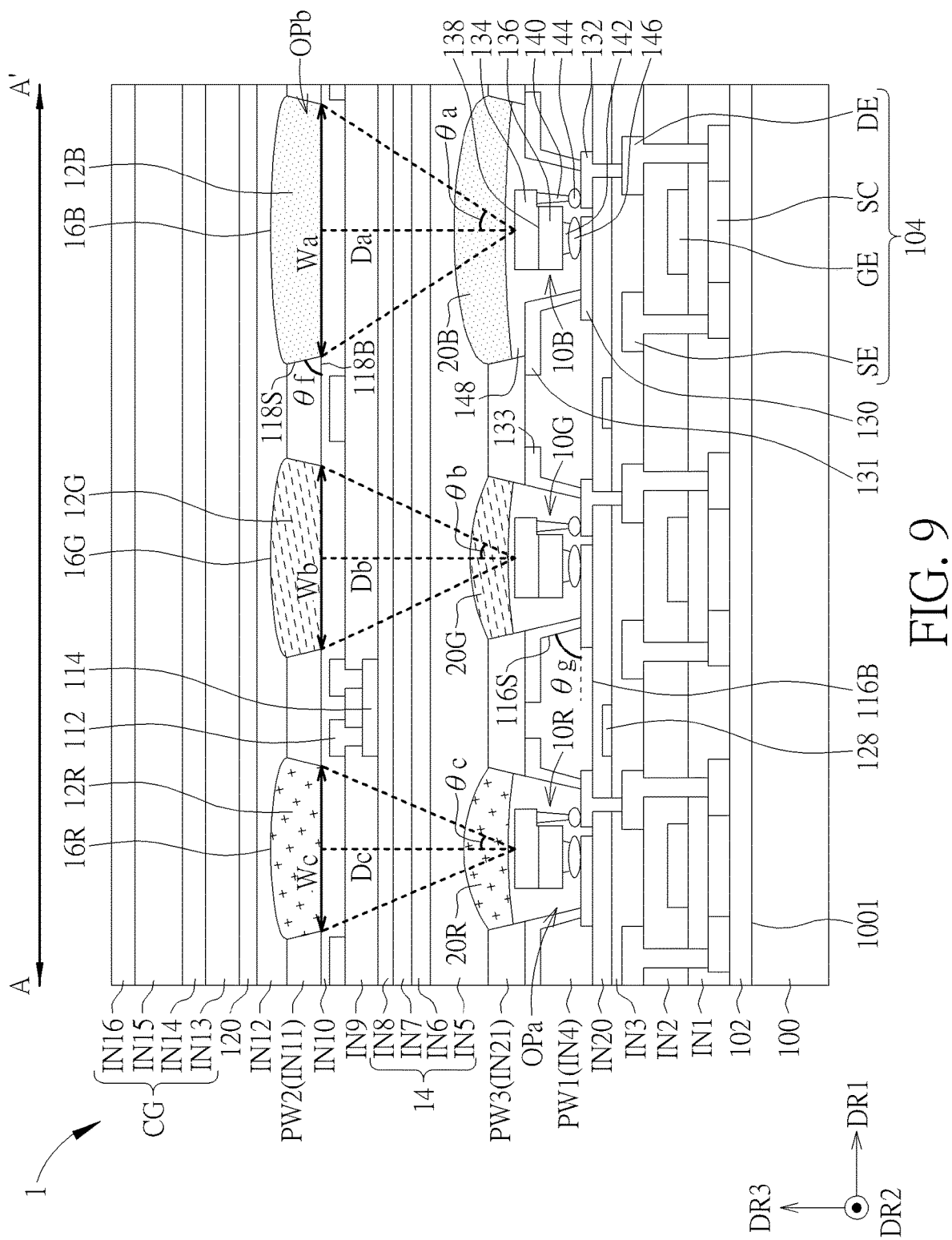
FIG. 9 is a schematic diagram illustrating a cross-sectional view of a display device according to a fifth embodiment of the present disclosure.

Please refer to FIG. 9, which is a schematic diagram illustrating a cross-sectional view of a display device according to a fifth embodiment of the present disclosure. In some embodiments, the sensing electrode may include a plurality of metal lines 128 disposed on the insulating layer IN3, and the material of the metal lines 128 may be the same as the material of the metal lines 112, but not limited thereto. In addition, an insulating layer IN20 may be disposed on the metal lines 128, and the material of the insulating layer IN20 may include an organic insulating material, an inorganic insulating material or a combination of the above, but not limited thereto.

Figure 10:
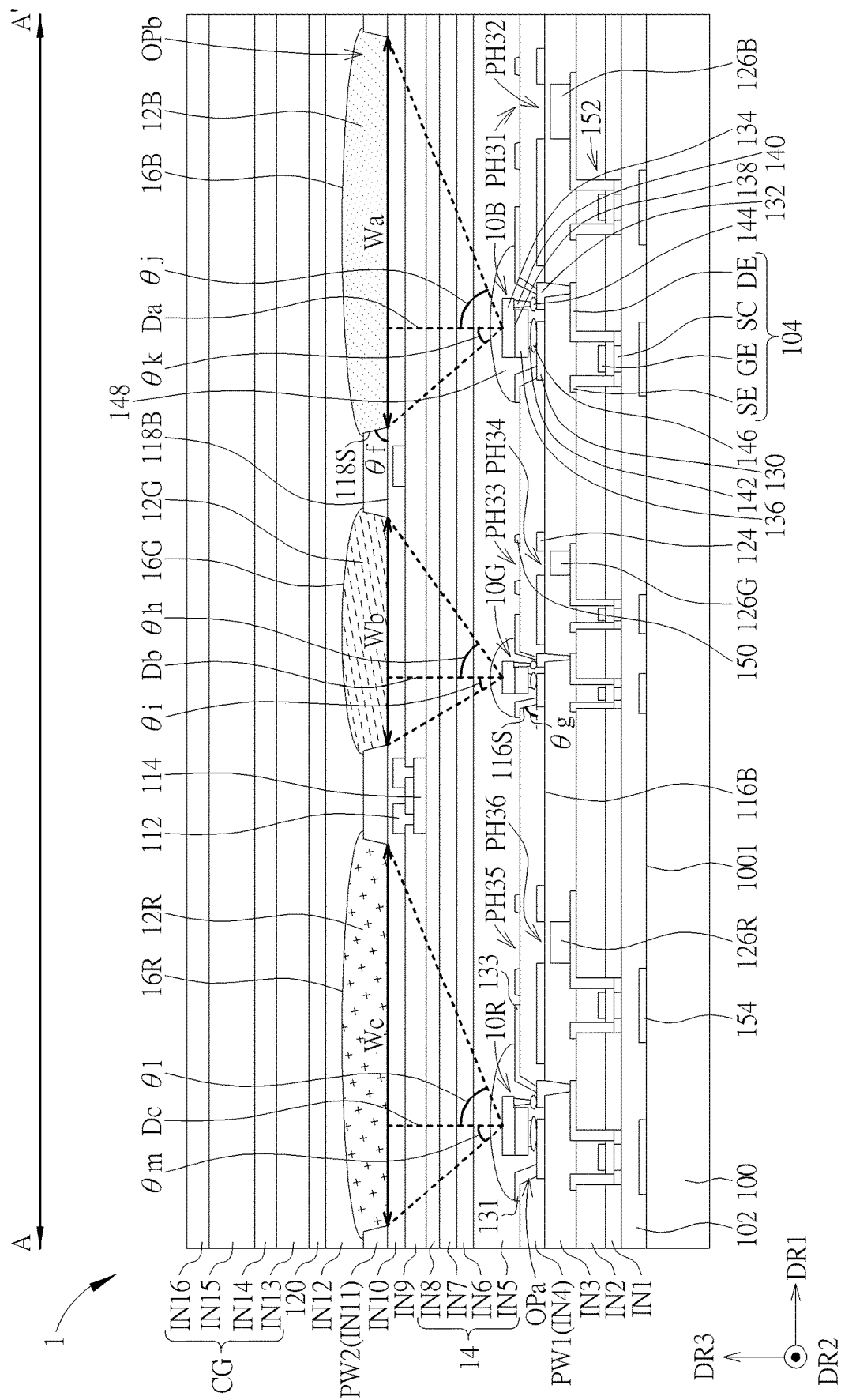
FIG. 10 is a schematic diagram illustrating a cross-sectional view of a display device according to a sixth embodiment of the present disclosure.
Figure 12:
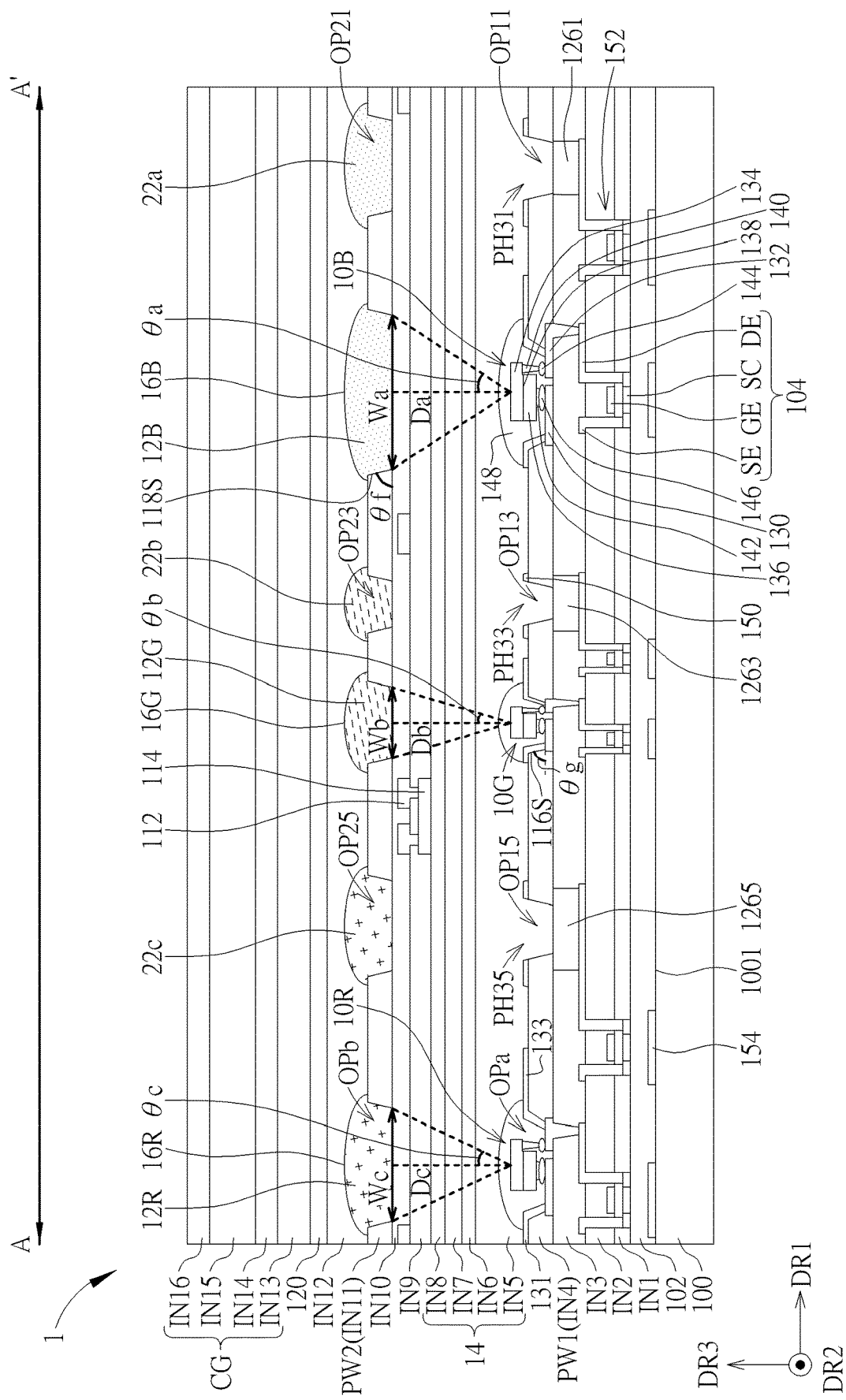
FIG. 12 is a schematic diagram illustrating a cross-sectional view of a display device according to a seventh embodiment of the present disclosure.

In the embodiments of FIG. 9, FIG. 10 and FIG. 12, the light-emitting units may include mini LEDs, micro LEDs, quantum dot LEDs or a combination of the above, but not limited thereto. The display device may include a plurality of electrodes 130 and a plurality of electrodes 132, and the electrodes 130, the electrodes 132 and the insulating layer IN4 may be disposed on the insulating layer IN20. Each of the electrodes 132 is electrically connected to a thin film transistor 104 through a contact hole in the insulating layer IN3 and the insulating layer IN20. The electrode 132 may transmit a signal of one of the cathode and the anode, and the electrode 130 may transmit a signal of the other one of the cathode and the anode, but not limited thereto.

The display device may include a plurality of electrodes 131 and a plurality of electrodes 133, the electrode 131 and the electrode 133 may be disposed on the side surface 116S of the partition wall PW1 and a portion of the upper surface of the partition wall PW1. The electrode 131 may be electrically connected to the electrode 130, and the electrode 133 may be electrically connected to the electrode 132.

The insulating layer IN4 may include a plurality of openings disposed between the partition walls PW1, an insulating layer IN21 disposed on the insulating layer IN4 may include a plurality of partition walls PW3 and a plurality of openings disposed between the partition walls PW3, and the openings of the insulating layer IN21 may overlap the openings of the insulating layer IN4. The material of the insulating layer IN4 may include a transparent organic insulating material, a transparent inorganic insulating material or a combination of the above, but not limited thereto. The material of the insulating layer IN21 may include an opaque organic insulating material, an opaque inorganic insulating material or a combination of the above, but not limited thereto.

The light-emitting units may be disposed in the openings OPa of the insulating layer IN4. The light-emitting unit may include a semiconductor layer 134, a semiconductor layer 136, a multiple-quantum well (MQW) layer 138, an electrode 140, an electrode 142, a bonding pad 144 and a bonding pad 146, but not limited thereto. The semiconductor layer 134 may be disposed on the semiconductor layer 136, and the multiple-quantum well layer 138 may be disposed between the semiconductor layer 134 and the semiconductor layer 136. The semiconductor layer 134 may be one of p-type semiconductor layer and n-type semiconductor layer, and the semiconductor layer 136 may be the other one of p-type semiconductor layer and n-type semiconductor layer.

The bonding pad 144 may be disposed between the electrode 140 and the electrode 132, the electrode 140 may be electrically connected to the semiconductor layer 134, and the semiconductor layer 134 may be electrically connected to the drain DE of the thin film transistor 104 through the electrode 140, the bonding pad 144 and the electrode 132. The bonding pad 146 may be disposed between the electrode 142 and the electrode 130, the electrode 142 may be electrically connected to the semiconductor layer 136, and the semiconductor layer 136 may be electrically connected to the electrode 130 through the electrode 142 and the bonding pad 146. The electrodes and the bonding pads may include conductive materials, but not limited thereto.

A plurality of encapsulation layers 148 may be disposed in the openings of the insulation layer IN4 and the openings of the insulation layer IN21 and at least on the light emitting diodes of the light-emitting units, and the encapsulation layers 148 may include transparent organic insulation materials, transparent inorganic insulation materials or a combination of the above, but not limited thereto.

A plurality of light conversion layers (such as a light conversion layer 20R, a light conversion layer 20G and a light conversion layer 20B) may be disposed on the encapsulation layers 148 and in the openings of the insulating layer IN21, but not limited thereto. The light conversion layer 20R may be disposed corresponding to the color filter 12R in the direction DR3, the light conversion layer 20G may be disposed corresponding to the color filter 12G in the direction DR3, and the light conversion layer 20B may be disposed corresponding to the color filter 12B in the direction DR3.

The light conversion layers may include quantum dots, fluorescent materials, phosphorescent materials, color filter layers, other suitable materials or a combination of the above, but not limited thereto. The light conversion layer 20B may convert the light of the light-emitting unit 10B into blue light, the light conversion layer 20G may convert the light of the light-emitting unit 10G into green light, and the light conversion layer 20R may convert the light of the light-emitting unit 10R into red light, but not limited thereto. In some embodiments, the light emitting diodes of the light-emitting units may emit blue light, but not limited thereto.

Figure 11:
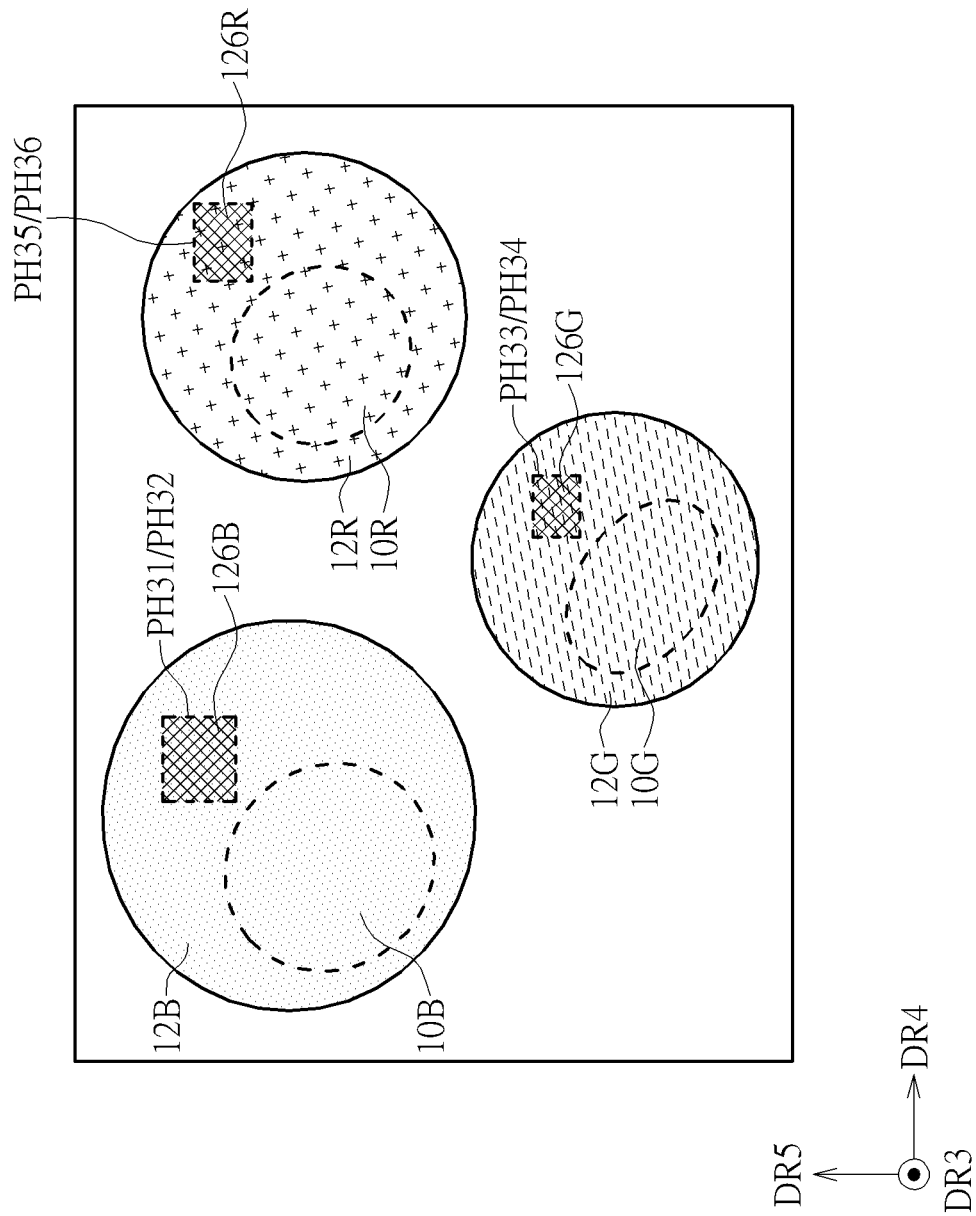
FIG. 11 is a schematic diagram illustrating a top view of the display device according to the sixth embodiment of the present disclosure.

Please refer to FIG. 10 and FIG. 11, FIG. 10 is a schematic diagram illustrating a cross-sectional view of a display device according to a sixth embodiment of the present disclosure, and FIG. 11 is a schematic diagram illustrating a top view of the display device according to the sixth embodiment of the present disclosure. As shown in FIG. 10, in some embodiments, the light-emitting unit 10B and a sensor 126B may be disposed under the color filter 12B in the direction DR3, the light-emitting unit 10G and a sensor 126G may be disposed under the color filter 12G in the direction DR3, and the light-emitting unit 10R and a sensor 126R may be disposed under the color filter 12R in the direction DR3. In some embodiments, the sensor may not be provided under some of the color filters.

The sensors under different color filters may be used to receive light with different wavelengths. For example, the sensor 126R may be used to receive light with a wavelength range that is greater than or equal to 620 nm and less than or equal to 750 nm, the sensor 126G may be used to receive light with a wavelength range that is greater than or equal to 495 nm and less than or equal to 570 nm, and the sensor 126B may be used to receive light with a wavelength range that is greater than or equal to 450 nm and less than or equal to 495 nm, but not limited thereto.

The sensor 126B, the sensor 126G and the sensor 126R may be disposed on the insulating layer IN2, and the sensor may be electrically connected to one thin film transistor 152. The shielding layer 124 may be disposed on the insulating layer IN3 and may have a pinhole PH32, a pinhole PH34 and a pinhole PH36. In addition, a shielding layer 150 may be disposed on the insulating layer IN4 and may have a pinhole PH31, a pinhole PH33 and a pinhole PH35. The material of the shielding layer 150 may be the same as the material of the shielding layer 124, but not limited thereto.

The pinhole PH31, the pinhole PH32 and the sensor 126B may be overlapped in the direction DR3, the pinhole PH33, the pinhole PH34 and the sensor 126G may be overlapped in the direction DR3, and the pinhole PH35, the pinhole PH36 and the sensor 126R may be overlapped in the direction DR3.

The pinholes under different color filters may have different sizes. As shown in FIG. 10, the width of the pinhole PH31 may be greater than the width of the pinhole PH35 and the width of the pinhole PH35 may be greater than the width of the pinhole PH33, or the width of the pinhole PH32 may be greater than the width of the pinhole PH36 and the width of the pinhole PH36 may be greater than the width of the pinhole PH34, but not limited thereto.

As shown in FIG. 11, the area of the pinhole PH31 may be greater than the area of the pinhole PH35 and the area of the pinhole PH35 may be greater than the area of the pinhole PH33, or the area of the pinhole PH32 may be greater than the area of the pinhole PH36 and the area of the pinhole PH36 may be greater than the area of the pinhole PH34, but not limited thereto. In addition, in the top view of FIG. 11, the outlines of the light-emitting unit 10G and the light-emitting unit 10B may have different shapes, that is, the outlines of different light-emitting units may have different shapes.

As shown in FIG. 10, two oblique lines from the center of the light-emitting unit 10B to two ends of the bottom surface of the color filter 12B and a vertical line from the center of the light-emitting unit 10B to the bottom surface of the color filter 12B may have an angle θj and an angle θk, Two oblique lines from the center of the light-emitting unit 10G to two ends of the bottom surface of the color filter 12G and a vertical line from the center of the light-emitting unit 10G to the bottom surface of the color filter 12G may have an angle θh and an angle θi. Two oblique lines from the center of the light-emitting unit 10R to two ends of the bottom surface of the color filter 12R and a vertical line from the center of the light-emitting unit 10R to the bottom surface of the color filter 12R may have an angle θl and an angle θm.

In some embodiments, the angle θh and the angle θi are different, the angle θj and the angle θk are different, and the angle θl and the angle θm are different. For example, the angle θh may be greater than the angle θi, the angle θj may be greater than the angle θk, and the angle θl may be greater than the angle θm, but not limited thereto.

In addition, a plurality of shielding patterns 154 may be disposed on the surface 1001 of the substrate 100 and correspondingly disposed under the thin film transistors 104 and the thin film transistors 152. The shielding patterns 154 may include an opaque material, but not limited thereto.

Figure 13:
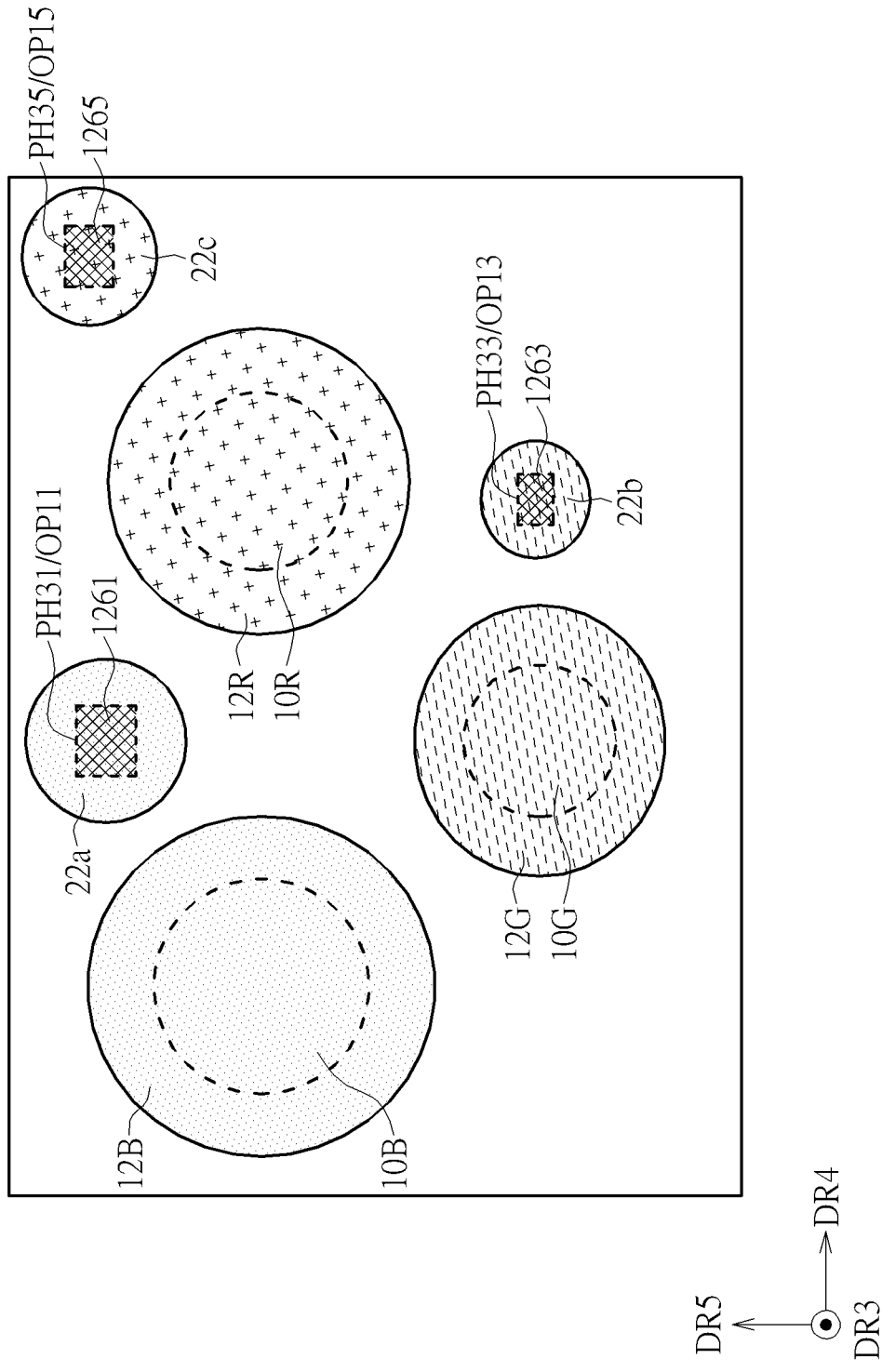
FIG. 13 is a schematic diagram illustrating a top view of the display device according to the seventh embodiment of the present disclosure.

Please refer to FIG. 12 and FIG. 13, FIG. 12 is a schematic diagram illustrating a cross-sectional view of a display device according to a seventh embodiment of the present disclosure, and FIG. 13 is a schematic diagram illustrating a top view of the display device according to the seventh embodiment of the present disclosure. In some embodiments, a sensor may be disposed on one side of the light-emitting unit, but not limited thereto. In some embodiments, the sensor may not be disposed on one side of light-emitting units emitting some of the colors. A sensor 1261 may be disposed on one side (such as the right side) of the light-emitting unit 10B, a sensor 1263 may be disposed on one side of the light-emitting unit 10G, and a sensor 1265 may be disposed on one side of the light-emitting unit 10R. The sensors may be disposed on the insulating layer IN2, and the sensor may be electrically connected to one thin film transistor 152.

The material of the insulating layer IN4 may include an opaque organic insulating material, an opaque inorganic insulating material or a combination of the above, but not limited thereto. As shown in FIG. 12, the insulating layer IN4 may include a plurality of partition walls PW1, a plurality of openings OPa, an opening OP11, an opening OP13 and an opening OP15, and these openings may be disposed between the partition walls PW1. The light-emitting unit 10R, the light-emitting unit 10G and the light-emitting unit 10B may be disposed in the openings OPa, the opening OP11 may be disposed on the sensor 1261, the opening OP13 may be disposed on the sensor 1263, and the opening OP15 may be disposed on the sensor 1265.

In addition, the shielding layer 150 may be disposed on the insulating layer IN4 and may have the pinhole PH31, the pinhole PH33 and the pinhole PH35. The pinhole PH31 may overlap the opening OP11, the pinhole PH33 may overlap the opening OP13, and the pinhole PH35 may overlap the opening OP15. The material of the shielding layer 150 may be the same as the material of the shielding layer 124, but not limited thereto.

The insulating layer IN11 may include a plurality of partition walls PW2, a plurality of openings OPb, an opening OP21, an opening OP23 and an opening OP25, and these openings may be disposed between the partition walls PW2. The color filter 12R, the color filter 12G and the color filter 12B may be disposed in the openings OPb. The opening OP21 may be disposed on the opening OP11, the opening OP23 may be disposed on the opening OP13, and the opening OP25 may be disposed on the opening OP15.

A color filter 22a may be disposed in the opening OP21, a color filter 22b may be disposed in the opening OP23, and a color filter 22c may be disposed in the opening OP25. The color filter 22a, the pinhole PH31, the opening OP11 and the sensor 1261 may be overlapped in the direction DR3, the color filter 22b, the pinhole PH33, the opening OP13 and the sensor 1263 may be overlapped in the direction DR3, and the color filter 22c, the pinhole PH35, the opening OP15 and the sensor 1265 may be overlapped in the direction DR3.

The color filter 22a, the color filter 22b and the color filter 22c may have different colors. For example, the color filter 22a may be a blue color filter, the color filter 22b may be a green color filter, and the color filter 22c may be a red color filter, but not limited thereto. In some embodiments, the color filter 22a, the color filter 22b and the color filter 22c may have the same color. For example, the color filter 22a, the color filter 22b and the color filter 22c may be green color filters, but not limited thereto.

The above pinholes or openings may have different widths or areas. For example, the width or area of the opening OP21 may be greater than the width or area of the opening OP25, and the width or area of the opening OP25 may be greater than the width or area of the opening OP23, but not limited thereto. The opening OP21, the opening OP23, the opening OP25, the pinhole PH31, the pinhole PH33, and the pinhole PH35 may also have the above features.

In some embodiments, one of the partition walls PW2 may be disposed between the color filter 22a and the color filter 12B, another one of the partition walls PW2 may be disposed between the color filter 22b and the color filter 12G, and another one of the partition walls PW2 may be disposed between the color filter 22c and the color filter 12R.

Figure 14:
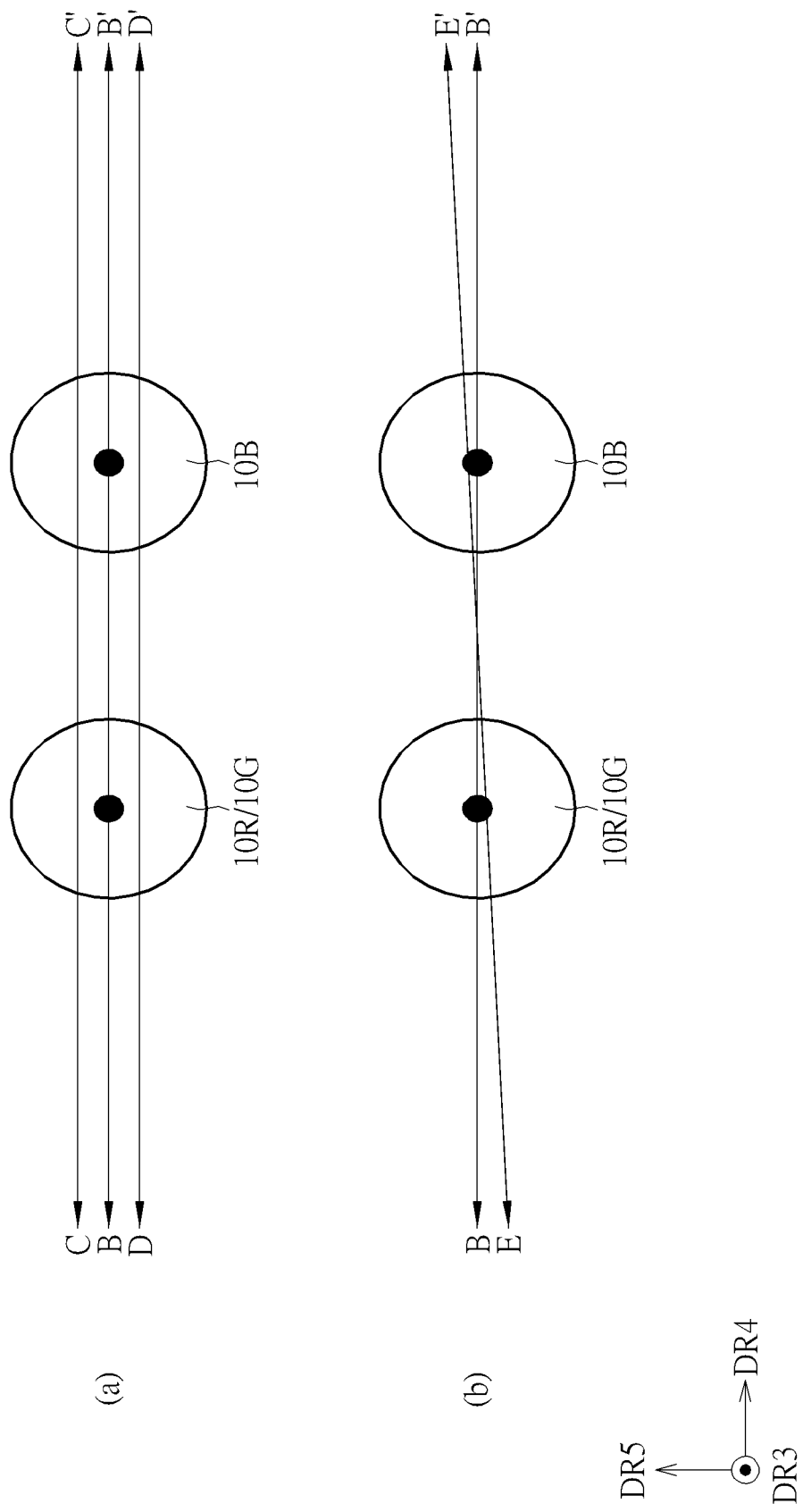
FIG. 14 is a schematic diagram illustrating a method for defining the cross-sectional structure of the display device of the present disclosure.

Please refer to FIG. 14, which is a schematic diagram illustrating a method for defining the cross-sectional structure of the display device of the present disclosure. In order to obtain the cross-sectional structure of the display device 1 (as shown in FIG. 1), the display device 1 may be cut along a line in the top view, and the line may pass through the geometric centers of at least two light-emitting units, but not limited thereto. As an example (a) in FIG. 14, the line B-B' may pass through the geometric centers of the light-emitting unit 10B and the light-emitting unit 10R, or may pass through the geometric centers of the light-emitting unit 10B and the light-emitting unit 10G, but not limited thereto.

Since the cutting process may have some deviations, the cross-sectional structure of the present disclosure may also correspond to the line C-C' or the line D-D'. In the direction DR5, the distance between the line C-C' and the line B-B' may be +5 μm, and the distance between the line D-D' and the line B-B' may be −5 μm. Therefore, the cross-sectional structure obtained according to the line in the range of the line B-B'±5 μm may be defined as the cross-sectional structure of the display device 1 of the present disclosure.

As shown in an example (b) in FIG. 14, the cross-sectional structure of the present disclosure may also correspond to the line E-E', and the difference between the line E-E' and the line B-B' is 3° to 5° (e.g., rotating counterclockwise). Therefore, the cross-sectional structure obtained according to the line B-B' rotating clockwise or counterclockwise by 3° to 5° may also be defined as the cross-sectional structure of the display device 1 of the present disclosure.

The display device of the present disclosure may reduce the reflected light generated by the ambient light by the color filters, and the color purity of different colors of light can be improved, thereby improving the display quality. In addition, the white point coordinates in the chromaticity diagram may shift when the display device generates the reflected light due to the ambient light. The problem of the shift of the white point coordinates may be solved by increasing the area of the color filter or the angle corresponding to the color filter and the light-emitting unit. For example, since the reflectivity of blue reflected light is low, the intensity of blue reflected light is weaker than the intensities of red reflected light and green reflected light, which makes the image yellow and shifts the white point coordinates of the chromaticity diagram. In the present disclosure, the intensity of the blue reflected light may be increased to correct the shift of the white point coordinates by increasing the area of the blue color filter or the angle corresponding to the blue color filter and the blue light-emitting unit, and an image with accurate color may be displayed.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device, comprising:
   a substrate comprising a surface;
   a first light-emitting unit and a second light-emitting unit disposed on the surface;

a first color filter disposed on the first light-emitting unit, wherein the first color filter is in a color of blue; and a second color filter disposed on the second light-emitting unit and different from the first color filter in color;

wherein the first color filter has a first width, a first distance is between the first color filter and the first light-emitting unit, the second color filter has a second width, and a second distance is between the second color filter and the second light-emitting unit, wherein the first width, the second width, the first distance, and the second distance satisfy an equation 1:

$$\tan^{-1}[(W1/2)/D1] > \tan^{-1}[(W2/2)/D2] \qquad \text{[equation 1]}$$

wherein W1 represents the first width, W2 represents the second width, D1 represents the first distance, and D2 represents the second distance.

2. The display device of claim 1, wherein the first width, the second width, the first distance, and the second distance satisfy an equation 2:

$$0° \leq \tan^{-1}[(W1/2)/D1] - \tan^{-1}[(W2/2)/D2] \leq 10°. \qquad \text{[equation 2]}$$

3. The display device of claim 1, wherein the first width and the first distance satisfy an equation 3:

$$28° \leq \tan^{-1}[(W1/2)/D1] \leq 61°. \qquad \text{[equation 3]}$$

4. The display device of claim 1, wherein the second color filter is in a color of red and the second width and the second distance satisfy an equation 4:

$$23° \leq \tan^{-1}[(W2/2)/D2] \leq 58°. \qquad \text{[equation 4]}$$

5. The display device of claim 1, wherein the second color filter is in a color of green and the second width and the second distance satisfy an equation 5:

$$22° \leq \tan^{-1}[(W2/2)/D2] \leq 56°. \qquad \text{[equation 5]}$$

6. The display device of claim 1, wherein a ratio of an area of the first color filter to an area of the first light-emitting unit is greater than or equal to 1.2 and less than or equal to 9.

7. The display device of claim 1, wherein a ratio of the first width of the first color filter to a width of the first light-emitting unit is greater than or equal to 1.2 and less than or equal to 9.

8. The display device of claim 1, wherein an outline of the first color filter has a curve in a top view of the display device.

9. The display device of claim 8, wherein a radius of curvature of the curve is greater than or equal to 8 um and less than or equal to 22 um.

10. The display device of claim 1, wherein the first color filter has a curved surface.

11. The display device of claim 1, wherein an outline of the first light-emitting unit is surrounded by an outline of the first color filter, and the outline of the first color filter is similar to the outline of the first light-emitting unit in a top view of the display device.

12. The display device of claim 1, further comprising:

a first partition wall disposed between the first light-emitting unit and the second light-emitting unit and comprising a first side surface adjacent to the first light-emitting unit and a first bottom surface connected to the first side surface; and a second partition wall disposed between the first color filter and the second color filter and comprising a second side surface adjacent to the first color filter and a second bottom surface connected to the second side surface;

wherein a first angle is between the first side surface and the first bottom surface, a second angle is between the second side surface and the second bottom surface, and a ratio of the first angle to the second angle is greater than or equal to 0.8 and less than or equal to 1.2.

* * * * *